United States Patent
Kang et al.

(10) Patent No.: US 9,900,455 B2
(45) Date of Patent: Feb. 20, 2018

(54) METHOD OF SCANNING DOCUMENT AND IMAGE FORMING APPARATUS FOR PERFORMING THE SAME

(71) Applicant: S-PRINTING SOLUTION CO., LTD., Suwon-si, Gyeonggi-do (KR)

(72) Inventors: Kyung-hoon Kang, Seoul (KR); Hyung-jong Kang, Seoul (KR); Jeong-hun Kim, Hwaseong-si (KR); Ho-keun Lee, Yongin-si (KR); Jee-hee Lee, Seoul (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/838,683

(22) Filed: Aug. 28, 2015

(65) Prior Publication Data

US 2016/0044198 A1    Feb. 11, 2016

Related U.S. Application Data

(63) Continuation-in-part of application No. 14/714,767, filed on May 18, 2015, now abandoned.

(60) Provisional application No. 62/035,573, filed on Aug. 11, 2014.

(30) Foreign Application Priority Data

Nov. 21, 2014   (KR) .......................... 10-2014-0163719

(51) Int. Cl.
   *H04N 1/00*      (2006.01)
   *H04N 1/387*    (2006.01)

(52) U.S. Cl.
   CPC ..... *H04N 1/00811* (2013.01); *H04N 1/00801* (2013.01); *H04N 1/00809* (2013.01); *H04N 1/3873* (2013.01); *H04N 1/3878* (2013.01)

(58) Field of Classification Search
   CPC ................................... H04N 1/00811
   See application file for complete search history.

(56) References Cited

U.S. PATENT DOCUMENTS

| | | | | |
|---|---|---|---|---|
| 6,623,528 | B1 * | 9/2003 | Squilla | H04N 1/3875 715/202 |
| 7,394,573 | B1 * | 7/2008 | Goldberg | G06T 1/0042 358/1.15 |
| 8,897,594 | B2 | 11/2014 | Okada et al. | |
| 2005/0210031 | A1 * | 9/2005 | Kasatani | H04N 1/00127 |
| 2010/0033742 | A1 * | 2/2010 | Hanawa | H04N 1/3871 358/1.9 |

(Continued)

FOREIGN PATENT DOCUMENTS

JP    6-162109    6/1994

OTHER PUBLICATIONS

U.S. Notice of Allowance dated Jan. 4, 2016, from U.S. Appl. No. 14/714,767.

(Continued)

*Primary Examiner* — Ibrahim Siddo
(74) *Attorney, Agent, or Firm* — Staas & Halsey LLP

(57) ABSTRACT

A method of scanning a document includes obtaining an original image by scanning a document; detecting at least one pair of marks disposed on the original image; extracting an image of an area that is defined by the detected at least one pair of marks from the original image; and creating a new document file by using the extracted image.

20 Claims, 22 Drawing Sheets

SCAN

AFTER EXTRACTING IMAGES OF AREAS DEFINED BY MARKS, CREATE NEW DOCUMENT FILE BY USING EXTRACTED IMAGES

(56) References Cited

U.S. PATENT DOCUMENTS

2013/0021629 A1* 1/2013 Kurilin ................ H04N 1/3878
358/1.9
2015/0262007 A1 9/2015 Sesum et al.

OTHER PUBLICATIONS

U.S. Notice of Allowance dated Apr. 20, 2016, from U.S. Appl. No. 14/714,767.
U.S. Appl. No. 14/714,767, filed May 18, 2015, Kyung-hoon Kang, Samsung Electronics Co., Ltd.

* cited by examiner

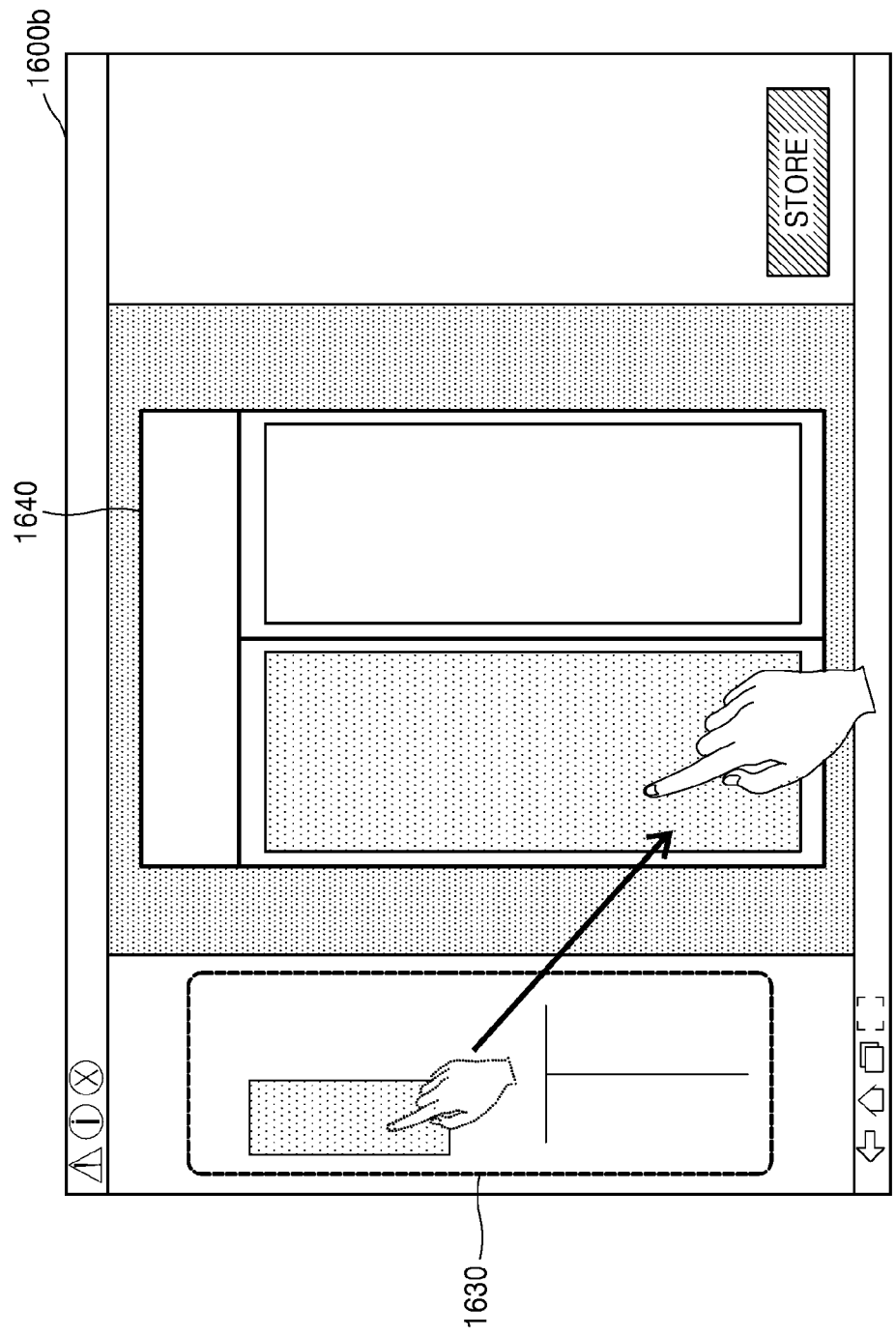

METHOD OF SCANNING DOCUMENT AND IMAGE FORMING APPARATUS FOR PERFORMING THE SAME

CROSS-REFERENCE TO RELATED APPLICATIONS

This application is a continuation-in-part of U.S. patent application Ser. No. 14/714,767, filed May 18, 2015, claiming priority under 35 U.S.C. § 119 to U.S. Provisional Patent Application No. 62/035,573, filed on Aug. 11, 2014, in the U.S. Patent and Trademark Office, and Korean Patent Application No. 10-2014-0163719, filed on Nov. 21, 2014, in the Korean Intellectual Property Office, the disclosures of which are incorporated by reference herein in their entireties.

BACKGROUND

1. Field

One or more exemplary embodiments relate to a method of scanning a document and an image forming apparatus for performing the same.

2. Description of the Related Art

A document is generally scanned in units of pages. That is, when the document is scanned, an image of an entire page is obtained. Accordingly, if a user wants to extract only some areas from a page of the document and then store the extracted areas of the page individually or create a new document based on the extracted areas, the user is required to use an editing program. In other words, after opening an original image that is obtained by scanning in an editing program and designating and extracting only desired areas of the original image, the user may store the extracted areas in separate files or may dispose images of the extracted areas in a desired layout and store the images as a new document file.

Likewise, there is an inconvenience that an editing program is required in order to extract and edit only some areas of a document.

SUMMARY

One or more exemplary embodiments include a method of scanning a document and an image forming apparatus for performing the same.

Additional aspects will be set forth in part in the description which follows and, in part, will be apparent from the description, or may be learned by practice of the presented exemplary embodiments.

According to one or more exemplary embodiments, a method of scanning a document includes obtaining an original image by scanning a document; detecting at least one pair of marks on the original image; extracting an image of an area that is defined by the detected at least one pair of marks from the original image; and creating a new document file using the extracted image.

In some embodiments, detecting the at least one pair of marks includes detecting objects having a predetermined color on the original image; and matching a pair of marks among the detected objects based on distances between the detected objects, color differences between the detected objects, and degrees to which the detected objects match a predetermined form.

In some embodiments, detecting the at least one pair of marks includes measuring a slope of the original image; rotating the original image based on the measured slope; and detecting at least one pair of marks on the rotated original image.

In some embodiments, detecting the at least one pair of marks includes determining vertical alignment of the original image; if the original image is determined to be upside down, rotating the original image rightside up; and detecting at least one pair of marks on the rotated original image.

In some embodiments, extracting the image includes automatically classifying a category of the extracted image according to a form of marks that define the area.

In some embodiments, creating the new document file includes confirming a predetermined layout; and creating a new document file by disposing the extracted image in the confirmed layout.

In some embodiments, creating the new document file includes individually storing the extracted image.

In some embodiments, creating the new document file includes extracting text by performing optical character recognition (OCR) on the extracted image; and storing a new document file including the extracted text.

According to one or more exemplary embodiments, an image forming apparatus includes an operation panel for displaying a screen and receiving a user input; a scanning unit for obtaining an original image by scanning a document when a scanning command is received through the operation panel; a controller for receiving the original image from the scanning unit and creating a new document file from the received original image; and a storage unit for storing data that is needed for creating the new document file, wherein the controller is configured to detect at least one pair of marks on the original image, extracts an image of an area that is defined by the detected at least one pair of marks, and creates a new document file by using the extracted image.

In some embodiments, the controller is configured to detect objects that have a predetermined color on the original image, and matches a pair of marks among the detected objects based on distances between the detected objects, color differences between the detected objects, and degrees to which the detected objects match a predetermined form.

In some embodiments, the controller is configured to measure a slope of the original image, rotates the original image based on the measured slope, and detects at least one pair of marks on the rotated original image.

In some embodiments, the controller is configured to determine vertical alignment of the original image, rotate the original image rightside up if the original image is determined to be upside down, and detect at least one pair of marks on the rotated original image.

In some embodiments, the controller is configured to automatically classify a category of the extracted image according to a form of marks that define the area.

In some embodiments, the controller configured to confirm a predetermined layout and create a new document file by disposing the extracted image in the confirmed layout.

In some embodiments, the controller is configured to individually store the extracted image.

In some embodiments, the controller is configured to extract text by performing optical character recognition (OCR) on the extracted image and create a new document file including the extracted text.

BRIEF DESCRIPTION OF THE DRAWINGS

These and/or other aspects will become apparent and more readily appreciated from the following description of the exemplary embodiments, taken in conjunction with the accompanying drawings in which:

FIGS. 16A and 16B illustrate UI screens for setting a layout for disposing cropped images on an application for implementing the method of scanning a document according to an embodiment;

DETAILED DESCRIPTION

Figure 1:
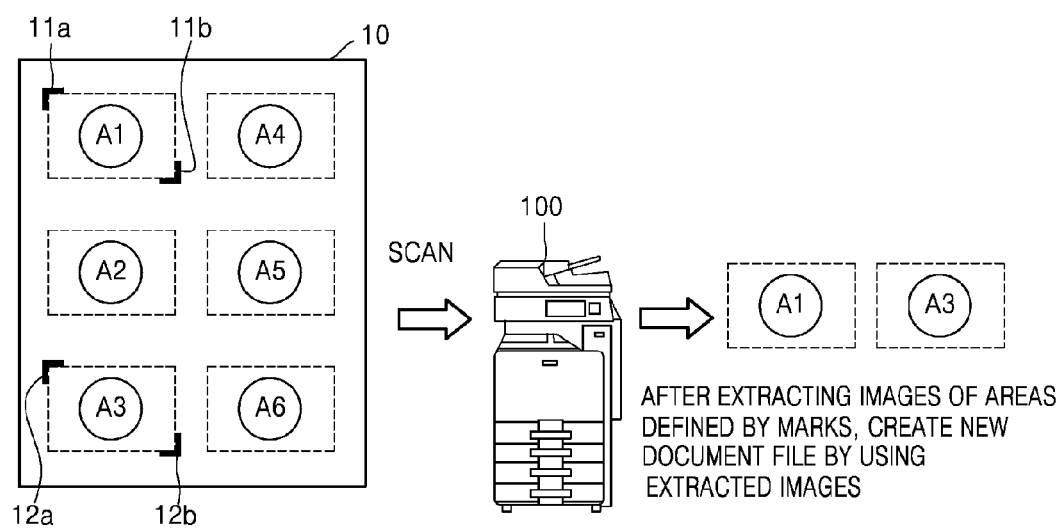
FIG. 1 is a diagram for describing basic operation characteristics of a method of scanning a document, according to an embodiment.

Reference will now be made in detail to exemplary embodiments, examples of which are illustrated in the accompanying drawings, wherein like reference numerals refer to like elements throughout. Description of details which would be well known to one of ordinary skill in the art to which the following embodiments pertain will be omitted to clearly describe the exemplary embodiments.

Expressions such as "at least one of," when preceding a list of elements, modify the entire list of elements and do not modify the individual elements of the list.

FIG. 1 is a diagram for describing basic operation characteristics of a method of scanning a document, according to an embodiment. The method of scanning a document, according to the present embodiment, is performed by using an image forming apparatus 100. In this regard, the image forming apparatus 100 may, for example, be an apparatus having a scanning function like a scanner or a multifunction printer.

According to the method of scanning a document, according to the present embodiment, the image forming apparatus 100 obtains an original image by scanning a document, automatically extracts images defined by marks from the obtained original image, and creates a new document file using the extracted images.

In detail, the image forming apparatus 100 may create a new document file by disposing the extracted images in a predetermined layout, may store the extracted images individually, or may extract text by performing optical character recognition (OCR) on the extracted images and create a new document file including the extracted text.

Referring to FIG. 1, a document 10 has, for example, first to sixth areas A1 to A6. The example six areas are obtained by arbitrarily partitioning the document 10, and the document 10 may be partitioned in various ways according to a page format of the document 10. For example, if the document 10 is a workbook, areas of the document 10 may each include one question. Also, the example first to sixth areas A1 to A6 may be uniform in size and separate from each other by a constant interval as illustrated, for example, in FIG. 1, for convenience of description. However, an area that may be defined by an actual mark is not limited thereto.

For example, four marks 11a, 11b, 12a, and 12b may be marked on the document 10. One pair of marks 11a and 11b of the four marks 11a, 11b, 12a, and 12b defines a first area A1, and the other pair of marks 12a and 12b defines a third area A3. In this regard, a form of marks that define areas is not limited to that illustrated in FIG. 1 and may be variously set.

When a user, as illustrated in FIG. 1, designates the first and third areas A1 and A3 that the user wants to be extracted from the document 10 by marking the document 10 with the marks 11a, 11b, 12a, and 12b and scans the document 10, the image forming apparatus 100 may automatically extract images of the first and third areas A1 and A3 defined by marks and reorganize the extracted images.

Figure 2:
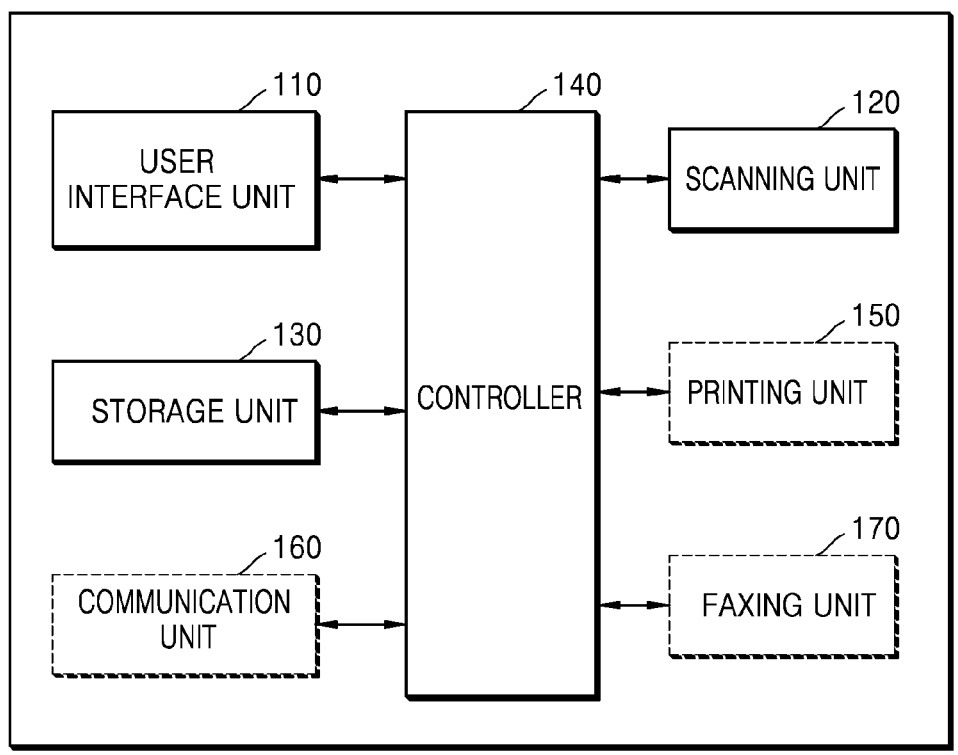
FIG. 2 illustrates a configuration of an image forming apparatus for implementing the method of scanning a document, according to an embodiment.

FIG. 2 illustrates an example configuration of the image forming apparatus 100 for implementing the method of scanning a document, according to an embodiment.

Referring to FIG. 2, the image forming apparatus 100 according to the present example embodiment may include, but is not limited to, a user interface unit 110, a scanning unit 120, a storage unit 130, a controller 140, a printing unit 150, a communication unit 160, and a fax unit 170. The printing unit 150, the communication unit 160, and the fax unit 170 are not essential configurations of the image forming apparatus 100 and may be optionally included according to need.

The user interface unit 110 is configured to provide information to the user by displaying a screen and to receive user input. For example, the user interface unit 110 may be an operation panel including a touch screen for displaying a screen and receiving a touch input and hard buttons for receiving a button input.

Also, a screen that displays an operation status of the image forming apparatus 100, an execution screen of an application installed in the image forming apparatus 100, or the like may be displayed on the user interface unit 110. In particular, user interface (UI) screens of an application for implementing the method of scanning a document according to an embodiment may be displayed on the user interface unit 110.

The scanning unit 120 obtains a scan image by scanning a document and provides the scan image to the controller 140 so that image processing may be performed on the scan image.

The storage unit 130 includes any recording medium capable of storing information, including, for example, a random access memory (RAM), a hard disk drive (HDD), a secure digital (SD) card, or the like, and different types of information may be stored in the storage unit 130. In particular, an application for implementing the method of scanning a document according to an embodiment may be stored in the storage unit 130. Also, a text database for performing OCR may be stored in the storage unit 130.

The controller 140 controls an operation of elements of the image forming apparatus 100. In particular, of the controller 140 may be configured to execute an application for implementing the method of scanning a document according to an embodiment. In detail, the controller 140 may be configured to detect marks on the scan image received from the scanning unit 120, extract images of areas that are defined by the detected marks, and create a new document file by using the extracted images.

The printing unit 150 and the fax unit 170 are configured to perform printing and faxing, respectively, and the communication unit 160 is configured to perform wired or wireless communication with a communication network or an external device.

An operation of each element of the image forming apparatus 100 will be described in detail below with reference to FIGS. 3 through 16B.

Figure 3:
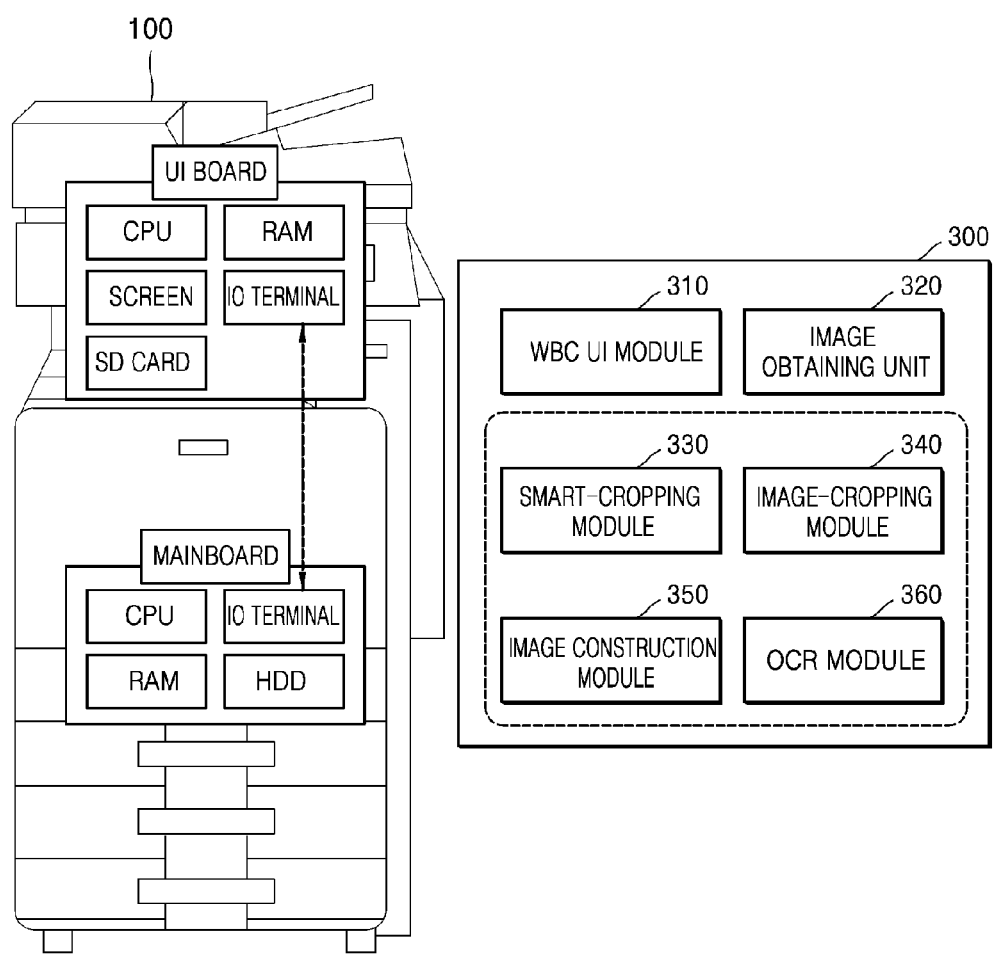
FIG. 3 illustrates a detailed hardware configuration of an image forming apparatus according to an embodiment and software configuration of an application for implementing the method of scanning a document according to an embodiment.

FIG. 3 illustrates an example of a detailed hardware configuration of the image forming apparatus 100 according to an embodiment and an example of a software configuration 300 of an application for implementing the method of scanning a document according to an embodiment.

Referring to FIG. 3, the image forming apparatus 100 may include a UI board and a mainboard. The UI board may include a central processing unit (CPU), RAM, a screen, an SD card, and an input/output (IO) terminal. The mainboard may include a CPU, RAM, an HDD, and an IO terminal.

FIG. 3 illustrates an example software configuration 300 of an application for implementing the method of scanning a document according to an embodiment. Hereinafter, the application for implementing the method of scanning a document according to an embodiment will be referred to as a workbook composer (WBC).

The software configuration 300 of the WBC may include a WBC UI module 310, an image-obtaining unit 320, a smart-cropping module 330, an image-cropping module 340, an image construction module 350, and an OCR module 360.

Modules included in the software configuration 300 of the WBC may be driven by using elements of the UI board of the image forming apparatus 100. In detail, the WBC UI module 310 displays an execution screen of a workbook composer application on the screen of the UI board and receives user input through the screen of the UI board. The image-obtaining unit 320 requests the mainboard to perform scanning via the IO terminal of the UI board and receives a scan image from the mainboard. The smart-cropping module 330, the image-cropping module 340, the image construction module 350, and the OCR module 360 perform image processing on the scan image that is received by the image-obtaining module 320 by using the CPU, the RAM, and/or the SD card of the UI board.

A detailed operation of the example software configuration 300 of the WBC in the method of scanning a document according to an embodiment is as follows:

When a command for scanning a document is input to the WBC UI module 310 by the user, the WBC UI module 310 requests a scan image from the image-obtaining unit 320. In response to the request of the WBC UI module 310, the image-obtaining unit 320 requests the mainboard for the availability of the image forming apparatus 100. If it turns out that scanning operation is available based on a result of confirming the availability of the image forming apparatus 100, the image-obtaining unit 320 requests the image forming apparatus 100 to perform scanning and obtains the scan image. The image-obtaining unit 320 transmits the obtained scan image to the WBC UI module 310, and the WBC UI module 310 transmits the received scan image to the smart-cropping module 330.

The smart-cropping module 330 performs image processing, such as deskewing, autorotation, mark detection, area extraction, and mark removal, on the received scan image and transmits the processed image to the WBC UI module 310 along with information about an extracted area. In this regard, the information about an extracted area, which is information that may specify the extracted area, may include, for example, coordinates of pixels included in the extracted area. Image processing operations performed in the smart-cropping module 330 will be described in detail below with reference to FIGS. 8 through 11.

Deskewing, autorotation, and mark removal are among the image processing operations performed in the smart-cropping module 330 and may be optionally performed depending on user settings. That is, if, before a document is scanned, the user sets the smart-cropping module 330, via the WBC UI module 310, not to perform at least one of deskewing, autorotation, and mark removal, the smart-cropping module 330 performs only image processing operations but not at least one of deskewing, autorotation, and mark removal.

The WBC UI module 310 transmits the received processed image and information about extracted areas to the image-cropping module 340. The image-cropping module 340 crops images of the extracted areas from the processed image using the received information about extracted areas and transmits the cropped images to the WBC UI module 310.

The WBC UI module 310 transmits the cropped images to the image construction module 350 or the OCR module 360 according to a user's command in order to create a new document file using the received cropped images.

When the user requests a new document file to be created by disposing the cropped images in the predetermined layout, the WBC UI module 310 transmits the cropped images to the image construction module 350. The image construction module 350 creates a new document file by disposing the cropped images in the predetermined layout and transmits the created document file to the WBC UI module 310.

When the user requests OCR to be performed on the cropped images, the WBC UI module 310 transmits the cropped images to the OCR module 360, and the OCR module 360 creates a new document file by extracting text from the cropped images and transmits the created document file to the WBC UI module 310.

Alternatively, when the user requests the cropped images to be stored individually, the WBC UI module 310 stores the received cropped images as individual document files.

When FIG. 3 is compared with FIG. 2, CPUs respectively included in the UI board and the mainboard of FIG. 3 correspond to the controller 140 of FIG. 2, and the RAM, the SD card, and the HDD correspond to the storage unit 130 of FIG. 2. Accordingly, the software configuration 300 of the WBC is executed by the controller 140 of FIG. 2.

Hereinafter, a method of scanning a document according to an embodiment will be described in detail with reference to FIGS. 4 through 16, and will be described with reference to the example configurations illustrated FIGS. 2 and 3, when necessary.

Figure 4:
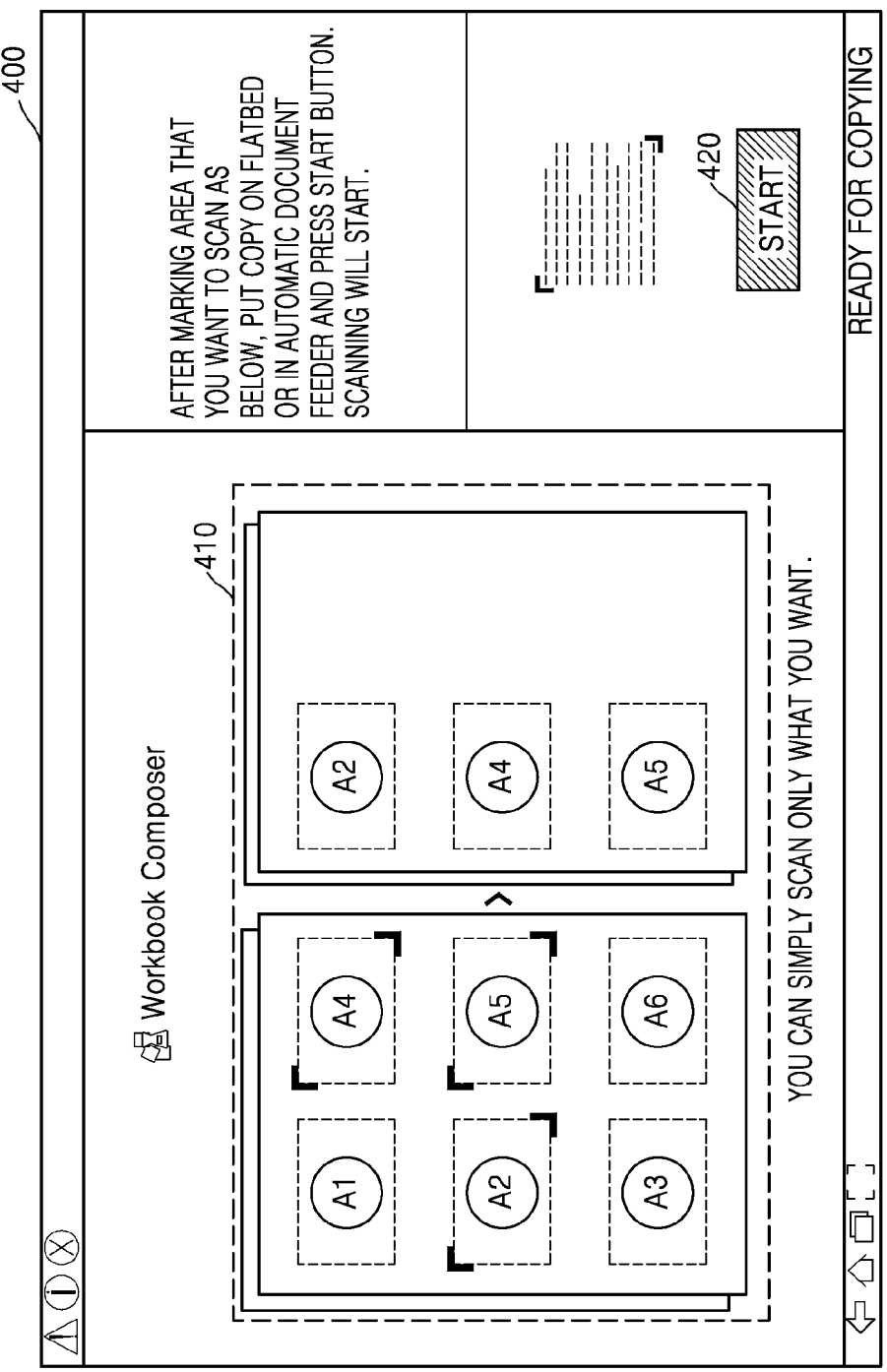
FIG. 4 illustrates a user interface (UI) screen that appears when an application for implementing the method of scanning a document according to an embodiment starts.

FIG. 4 illustrates a UI screen 400 that appears when an application for implementing an example method of scanning a document according to an embodiment, that is, a WBC, starts. The UI screen 400 is displayed on a screen of the user interface unit 110.

An example screen for guiding a method of using the WBC is displayed on an area 410 of the UI screen 400. A user may see the example screen displayed on the area 410 of the UI screen 400, confirm a method of defining areas by marking with marks, and predict a result to be obtained by scanning.

When the user puts a document, on which marks define areas, on the scanning unit 120 and touches a start button 420, the scanning unit 120 starts scanning the document. In this regard, as described with reference to FIG. 3, the WBC UI module 310 requests a scan image from the image-obtaining unit 320, and the image-obtaining unit 320 obtains the scan image from the scanning unit 120 and transmits the scan image to the WBC UI module 310.

Figure 5:
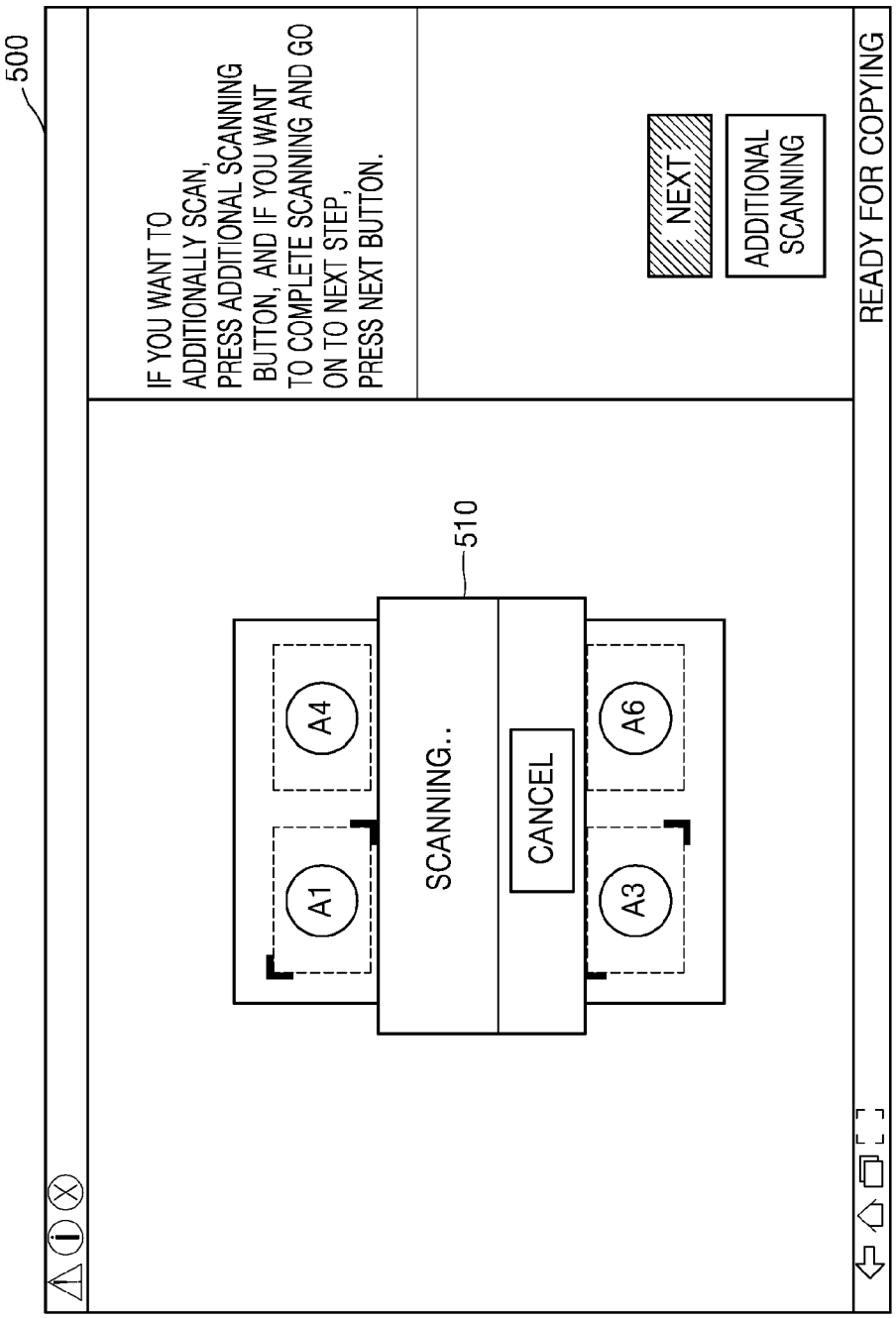
FIG. 5 illustrates a UI screen displayed during scanning on an application for implementing the method of scanning a document according to an embodiment.

Referring to FIG. 5, while the document is scanned, a UI screen 500 is displayed on the user interface unit 110. A pop-up 510 showing that scanning is currently being performed is displayed on the UI screen 500.

In regard to scanning the document, the user may set scanning options, such as scanning resolution, document source, size, and the like, in advance via the user interface unit 110. Alternatively, the controller 140 may automatically set scanning options such that an optimum result may be obtained according to the capability of the scanning unit 120.

Figure 6:
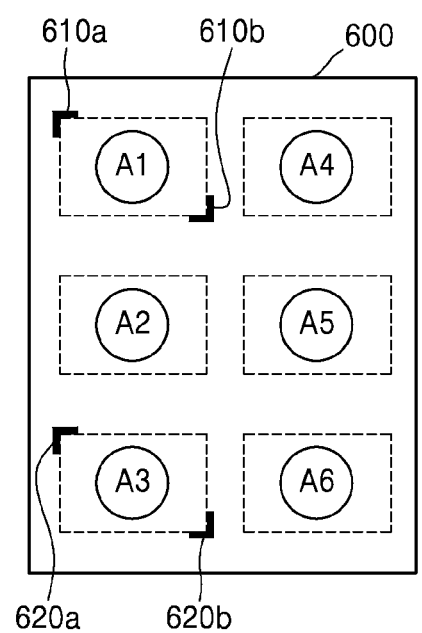
FIG. 6 illustrates an original image obtained by scanning a document in a method of scanning a document according to an embodiment.

FIG. 6 illustrates an original image 600 obtained by scanning a document in a method of scanning a document according to an embodiment.

Referring to FIG. 6, the original image 600 obtained by scanning the document includes first to sixth areas A1 to A6, and a pair of marks 610a and 610b and a pair of marks 620a and 620b that respectively define the first area A1 and the third area A3 on the original image 600. As the original image 600 obtained as such is provided to the controller 140, image processing is performed on the original image 600.

If a slanted or skewed document is scanned or a document that is upside down is scanned, an original image obtained by scanning is misaligned, and thus, it may be unsuitable to perform image processing on the original image. Accordingly, in this case, the original image is preprocessed to be in a suitable form for image processing, and then, image processing is performed. Hereinafter, a process of, when an original image is misaligned, preprocessing the original image so that the original image may be in a suitable form for image processing will be described with reference to FIGS. 7 through 9.

Figure 7:
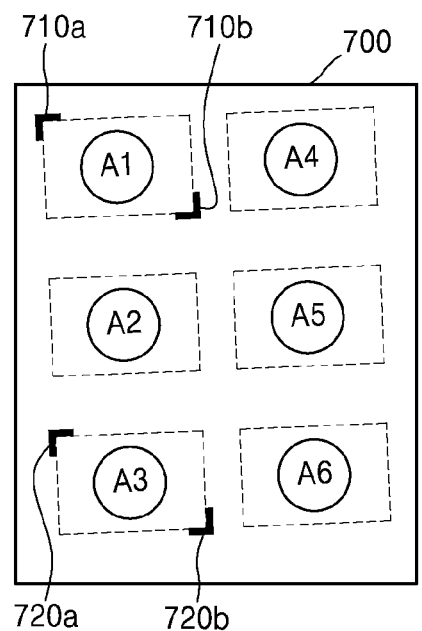
FIG. 7 illustrates an original image obtained by scanning a slanted document in the method of scanning a document according to an embodiment.

FIG. 7 illustrates an original image 700 obtained by scanning a slanted or misaligned document.

Referring to FIG. 7, the original image 700 is slanted at a small angle. The original image 700 of FIG. 7 also includes first to sixth areas A1 to A6, and a pair of marks 710a and 710b and a pair of marks 720a and 720b that respectively define the first area A1 and the third area A3 are marked on the original image 700.

The smart-cropping module 330 measures a slope and vertical alignment of the slanted original image 700. By performing deskewing and autorotation according to a measurement result, the original image 700 may be modified in a suitable form for subsequent image processing such as mark detection and area extraction.

Figure 8:
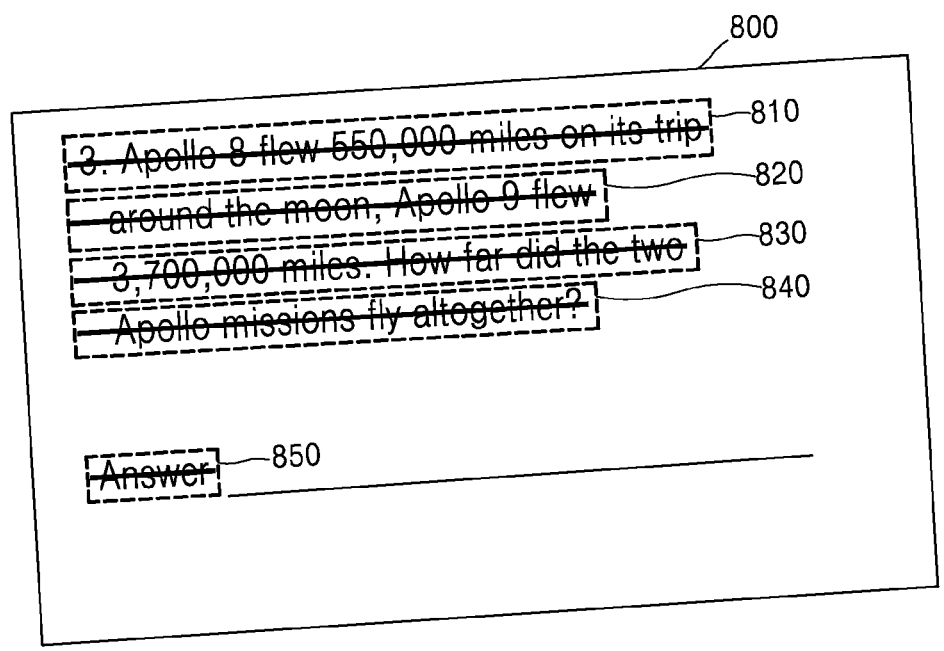
FIG. 8 is a diagram for describing a method of performing deskewing for alignment of an original image in the method of scanning a document according to an embodiment.

FIG. 8 is a diagram for describing a method of performing deskewing for alignment of an original image in a method of scanning a document according to an embodiment.

In FIG. 8, a detailed image 800 in the third area A3 of the original image 700 illustrated in FIG. 7 is illustrated. Referring to FIG. 8, the smart-cropping module 330 determines each of texts included in the detailed image 800 as an object, and forms groups 810, 820, 830, 840, and 850 by connecting neighboring objects to one another.

Next, the smart-cropping module 330 measures a slope of the objects included in each of the groups 810, 820, 830, 840, and 850 and calculates an average value of the measured slopes. That is, the smart-cropping module 330 respectively measures the slopes of the groups 810, 820, 830, 840, and 850 and calculates an average value of the measured slopes. The smart-cropping module 330 rotates the original image 700 of FIG. 7 as much as a certain angle according to the calculated average value of the measured slopes.

Figure 9:
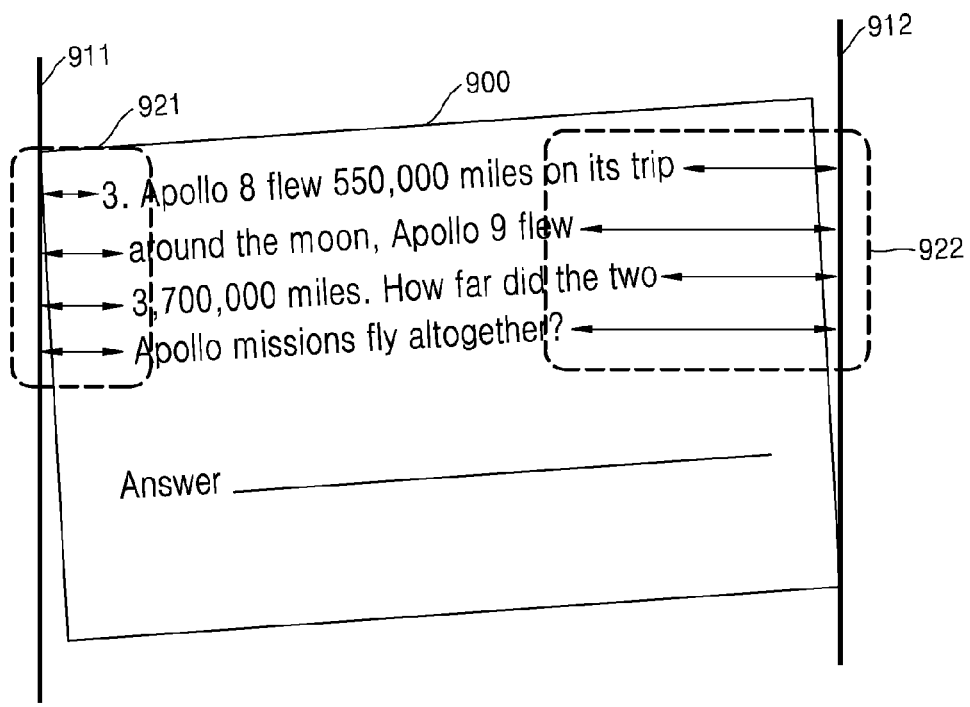
FIG. 9 is a diagram for describing a method of performing autorotation for alignment of an original image in the method of scanning a document according to an embodiment.

FIG. 9 is a diagram for describing a method of performing autorotation for alignment of an original image in a method of scanning a document according to an embodiment.

In FIG. 9, a detailed image 900 in the third area A3 of the original image 700 illustrated in FIG. 7 is illustrated. Referring to FIG. 9, the smart-cropping module 330 measures a distance between each line of texts included in the detailed image 900 and a left fiducial line 911 and a distance between each line of texts included in the detailed image 900 and a right fiducial line 912 and determines vertical alignment of the document based on the measured distances.

In detail, the smart-cropping module 330 compares a variation in distances measured in a left area 921 with a variation in distances measured in a right area 922. Referring to FIG. 9, while the distances measured in the left area 921 are substantially similar and have a small difference therebetween, the distances measured in the right area 922 have a relatively large variation. Generally, compared to a right side of the document, a left side of a document is aligned. Therefore, in the case of FIG. 9, vertical alignment of the document is determined to be correct.

However, if a variation in distances measured in a left area of a document is greater than a variation in distances measured in a right area of the document, the document is determined to be upside down. Then, the smart-cropping module 330 rotates the document rightside up to correct vertical alignment of the document.

Figure 10:
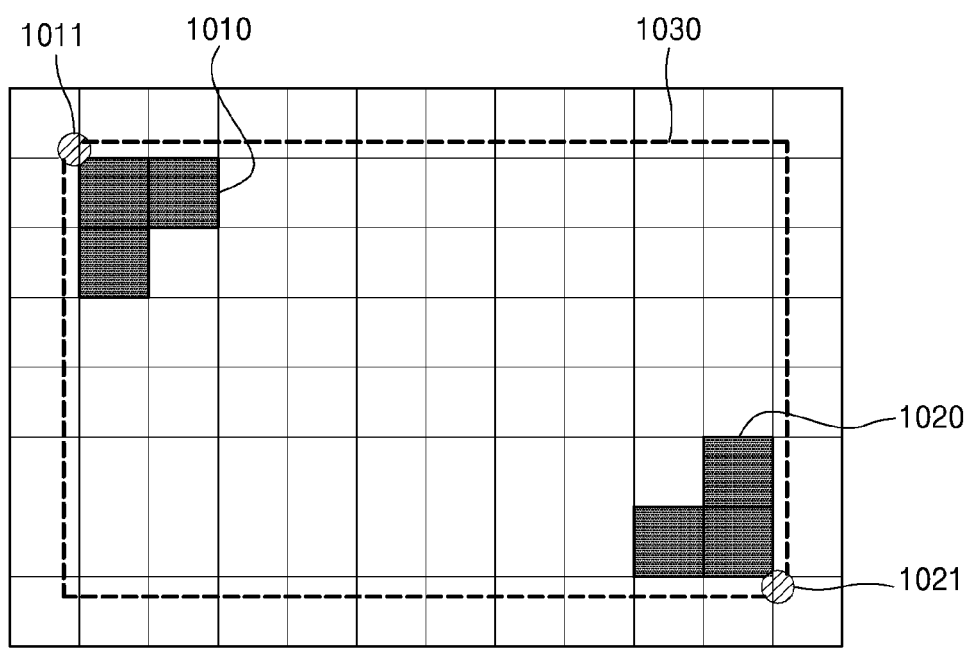
FIGS. 10 and 11 are diagrams for describing a method of detecting marks on an original image in the method of scanning a document according to an embodiment.
Figure 11:
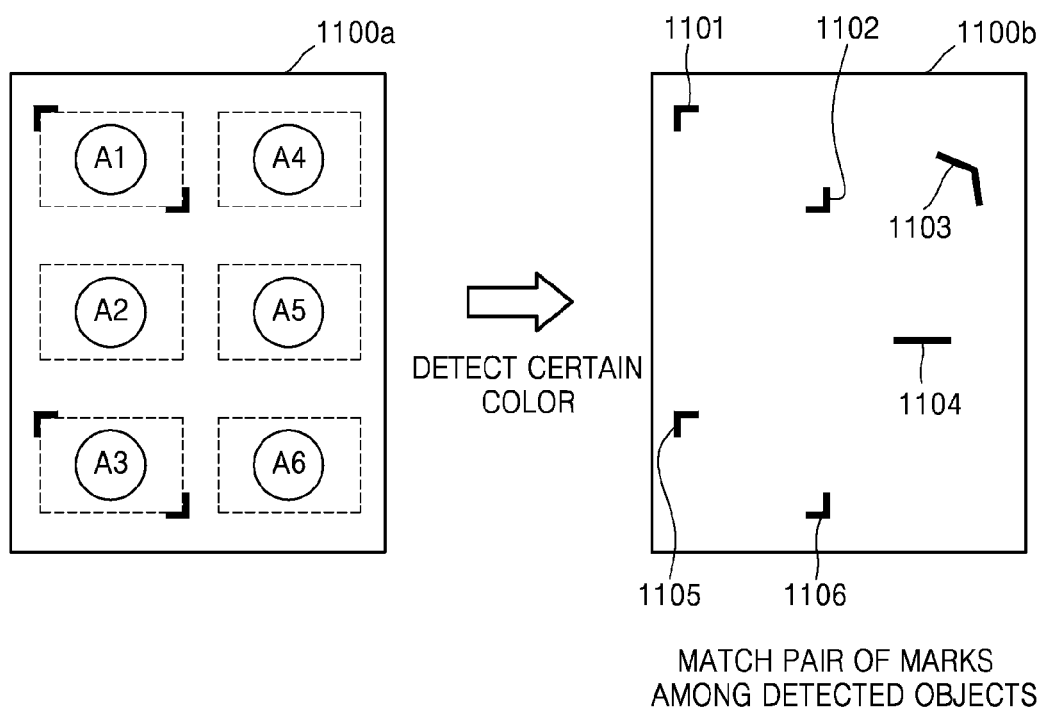

FIGS. 10 and 11 are diagrams for describing an example method of detecting marks on an original image in a method of scanning a document according to an embodiment.

The smart-cropping module 330 checks each pixel of the original image to detect marks having a predetermined color and/or form. In FIG. 10, a top left mark 1010 and a bottom right mark 1020 that are expressed by image pixels are each illustrated. When the marks having the predetermined color and/or form are detected, coordinates of the detected marks are obtained.

A method of detecting the coordinates of the detected marks may vary. For example, in the case of the top left mark 1010, the smart-cropping module 330 obtains a coordinate of a top left point 1011 of the top left mark 1010 and determines the top left mark 1010 as a "start" mark. In the case of the bottom right mark 1020, the smart-cropping module 330 obtains a coordinate of a bottom right point 1021 of the bottom right mark 1020 and determines the bottom right mark 1020 as an "end" mark. When the coordinates of a start mark and an end mark are each obtained as such, an area 1030 defined by the pair of marks is specified. That is, when the smart-cropping module 330 extracts an area defined by marks, coordinates of a pair of marks are obtained.

When the coordinates of the start mark and the end mark obtained by the smart-cropping module 330 are transmitted as information about the extracted area to the WBC UI module 310, the WBC UI module 310 transmits the received coordinates to the image-cropping module 340. The image-cropping module 340 may specify the extracted area based on the received coordinates.

An example method of detecting a pair of marks from an original image will be described in detail with reference to FIG. 11.

Referring to FIG. 11, the smart-cropping module 330 may obtain a first image 1100b by detecting an object having a predetermined color from an original image 1100a. Objects having the predetermined color are included in the first image 1100b. Referring to FIG. 11, besides marks 1101, 1102, 1105, and 1106 that have been marked by a user, objects 1103 and 1104 having a predetermined color are further included in the first image 1100b.

The smart-cropping module 330 may apply weights to various features and match a pair of marks according to an order of high result value in order to detect marks among all the objects included in the first image 1100b.

In detail, the smart-cropping module 330 applies a weight to each of the features such as distances between objects, color differences between the objects, degrees to which the objects match a predetermined form, and/or the number of edges on a boundary of an area that is defined by two objects, or the like. However, since the above features given as examples are arbitrarily set in order to increase the accuracy of mark detection, some features may be omitted or replaced by other features according to need.

The smart-cropping module 330 predetermines an average value of distances between pairs of marks, and, as a distance between any two objects is close to the average value, applies large weights to the two objects. As a color difference between any two objects is little, the smart-cropping module 330 applies large weights to the two objects. As the degree to which an object matches a predetermined form is high, the smart-cropping module 330 applies a large weight to the object. As the number of edges on a boundary of an area that is defined by any two objects is little, the smart-cropping module 330 applies large weights to the two objects.

After applying a weight to each of the features as such, the smart-cropping module 330 matches any two objects in the order of high result values and determines the two objects as a pair of marks.

When detecting pairs of marks is completed, the smart-cropping module 330 extracts areas that are defined by the detected pairs of marks and removes the marks from the original image. Next, the smart-cropping module 330 transmits information about the extracted areas, that is, coordinates of the pairs of marks, to the WBC UI module 310 along with the image from which the marks have been removed, and the WBC UI module 310 transmits the information about the extracted areas to the image-cropping module 340.

In this regard, before transmitting the information about the extracted areas to the image-cropping module 340, the WBC UI module 310 may provide a preview of the extracted areas to the user so that the user may have a chance to confirm and correct the extracted areas. Such a process will be described below with reference to FIG. 12.

Figure 12:
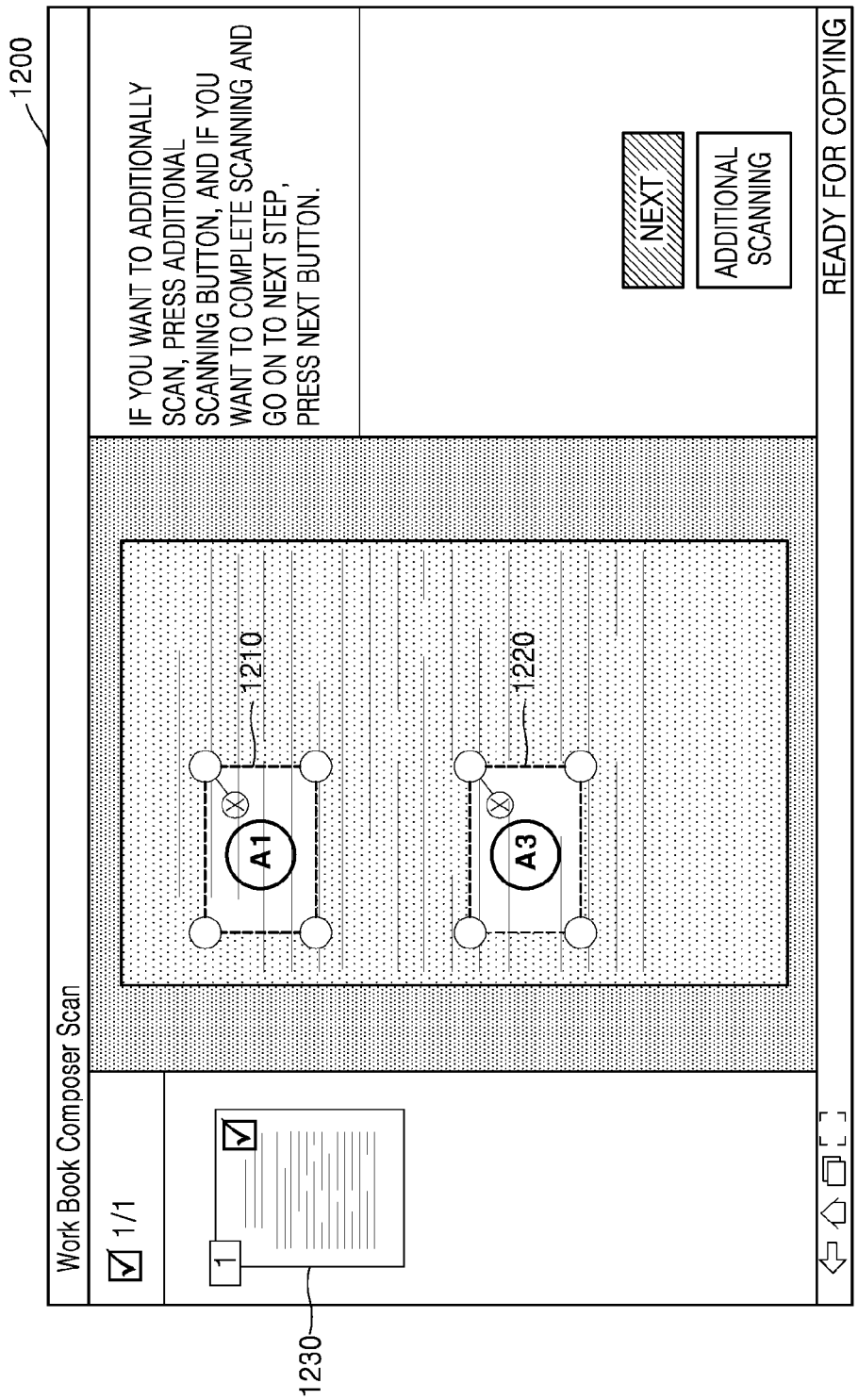
FIG. 12 illustrates a UI screen displaying a preview of extracted areas on an application for implementing the method of scanning a document according to an embodiment.

FIG. 12 illustrates a UI screen 1200 displaying a preview of extracted areas on an application for implementing the method of scanning a document according to an embodiment.

A WBC according to an embodiment may provide a preview of extracted areas so that, after areas that are defined by marks are extracted, a user may confirm if the extracted areas are accurate or if any correction should be made to the extracted areas. That is, as illustrated in FIG. 12, the WBC UI module 310 may display a preview of displaying the extracted areas on the user interface unit 110 by using information about the extracted areas which is received from the smart-cropping module 330 and receive confirmation and correction inputs by the user.

On the UI screen 1200 of FIG. 12, a preview of an entire scan image of the whole document is displayed as a thumbnail image 1230 on the left side of the UI screen 1200. Also, in the center of the UI screen 1200, a preview including displays 1210 and 1220 of the extracted areas is displayed. The user may expand or reduce the sizes of the extracted areas by simultaneously touching two or more corners among corners of each of the displays 1210 and 1220 of the extracted areas and expanding or contracting his or her fingers. Also, the user may delete the extracted areas by touching "X" on the displays 1210 and 1220 of the extracted areas. Also, the user may define a new extraction area by touching a portion outside the extracted areas for a long time or touching the portion outside the extracted areas with two fingers.

As described above, the WBC according to the present embodiment may prevent an error that may occur in processes of mark detection and area extraction by providing a chance to confirm and correct the extracted areas to the user.

Figure 13:
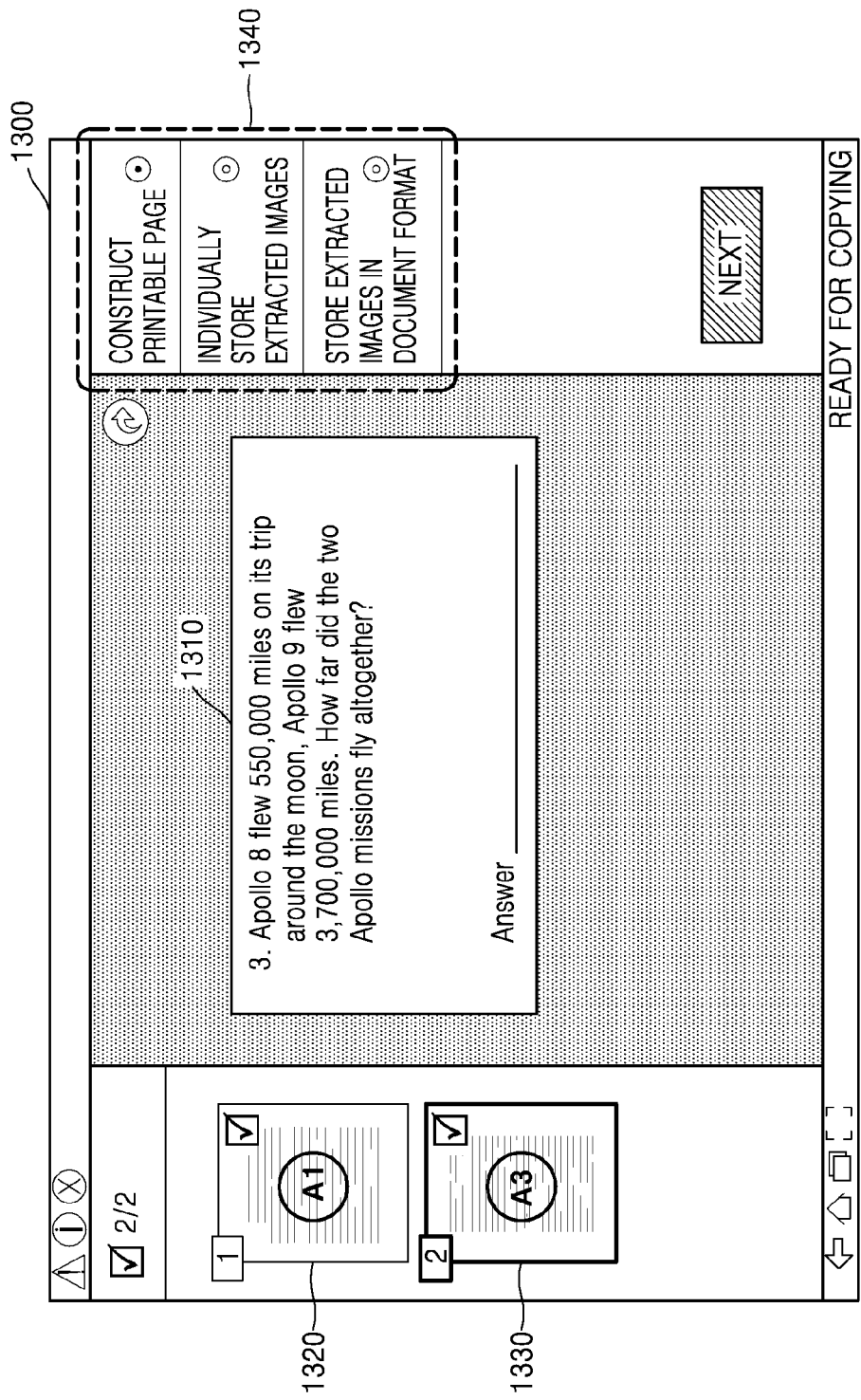
FIG. 13 illustrates a UI screen displaying a preview of cropped images on an application for implementing the method of scanning a document according to an embodiment.

FIG. 13 illustrates a UI screen 1300 displaying a preview of cropped images on an application for implementing the method of scanning a document according to an embodiment.

When a user completes confirming and correcting extracted areas, the WBC UI module 310 transmits information about final extracted areas and an image from which marks have been removed, which are received from the smart-cropping module 330, to the image-cropping module 340. By using the information about the final extracted areas, the image-cropping module 340 crops images of the extracted areas from the image from which the marks have been removed. When the cropping of the images is completed, the image-cropping module 340 transmits the cropped images to the WBC UI module 310.

When the WBC UI module 310 receives the cropped images from the image-cropping module 340, the UI screen 1300 for displaying a preview of the cropped images and receiving selection of an operation to be performed on the cropped images is displayed on the user interface unit 110.

Referring to FIG. 13, on the left side of the UI screen 1300, previews of images of a first area A1 and a third area A3 that have been cropped are displayed as thumbnail images 1320 and 1330. In the center of the UI screen 1300, a detailed preview 1310 of the third area A3 selected from among thumbnail images on the left side of the UI screen 1300 is displayed. The user may, via the UI screen 1300 of FIG. 13, confirm again if an image of a desired area has been accurately extracted.

On the right side of the UI screen 1300, an operation selection list 1340 is displayed. The user may select an operation to be performed on the cropped images via the operation selection list 1340.

In detail, when the item "CONSTRUCT PRINTABLE PAGE" is selected from the operation selection list 1340, the WBC UI module 310 transmits the cropped images to the image construction module 350. The image construction module 350 creates a new document file by disposing the received cropped images in a predetermined layout and transmits the created document file to the WBC UI module 310. The WBC UI module 310 may display a preview of the received document file on the user interface unit 110 so that the user may confirm the document file. The preview of the document file created by the image construction module 350 is illustrated in FIG. 14.

When the item "INDIVIDUALLY STORE EXTRACTED IMAGES" is selected from the operation selection list 1340, the WBC UI module 310 stores each of the cropped images as an individual document file.

When the item "STORE EXTRACTED IMAGES IN DOCUMENT FORMAT (OCR)" is selected from the operation selection list 1340, the WBC UI module 310 transmits the cropped images to the OCR module 360. The OCR module 360 extracts text by performing OCR on the received cropped images. That is, the OCR module 360 extracts text by matching the cropped images with a text database stored in the storage unit 130. When extracting text from the cropped images is completed, the OCR module 360 creates a new document file including the extracted text and transmits the document file to the WBC UI module 310. The WBC UI module 310 provides a preview of the received document file to the user interface unit 110. The user may, via the preview, confirm if text has been accurately extracted, and, if necessary, change a font of text, a size of text, a color of text, and the like.

Figure 14:
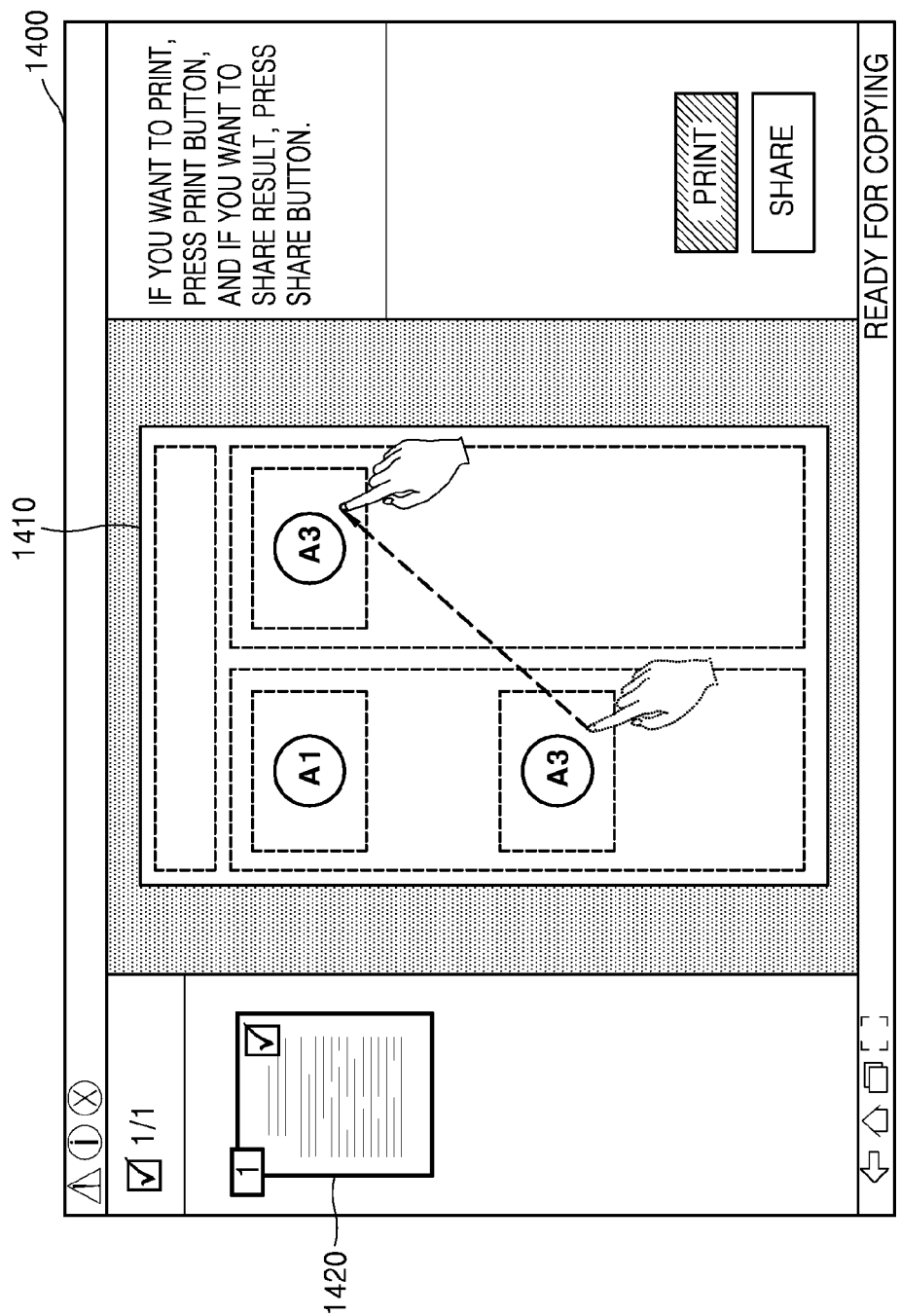
FIG. 14 illustrates a UI screen displaying a preview of a document created by reorganizing cropped images on an application for implementing the method of scanning a document according to an embodiment.

FIG. 14 illustrates a UI screen 1400 displaying a preview of a document created by reorganizing cropped images on an application for implementing the method of scanning a document according to an embodiment.

As described above, when the WBC UI module 310 receives a document file created by disposing the cropped images in a predetermined layout from the image construction module 350, the WBC UI module 310 may display the UI screen 1400 including a preview of the received document file on the user interface unit 110.

On the left side of the UI screen 1400 of FIG. 14, a preview of an entire newly created document file is displayed as a thumbnail image 1420, and in the center of the UI screen 1400, a detailed preview 1410, in which a layout may be changed, is displayed.

A user may confirm a layout of the created document file via the detailed preview 1410 displayed on the UI screen 1400 and may change the layout by dragging and dropping the cropped images.

When the image construction module 350 creates a new document by disposing the cropped images in a predetermined layout, in the case that the cropped images each include a number according to an order of those on an original document, original numbers of the cropped images are deleted and the cropped images may be newly numbered according to an order of those on the new document. For example, as shown in the detailed preview 1310 of FIG. 13, the cropped image of the third area A3 has the number "3" according to an order of the original document. However, since, in the detailed preview 1410 of FIG. 14, the cropped image of the third area A3 comes second, the image construction module 350 may delete "3" from the cropped image of the third area A3 and number the cropped image of the third area A3 "2" instead.

The user may confirm the layout of the new document file on the UI screen 1400 of FIG. 14 and then print the new document or share the new document with another user by selecting a "PRINT" button or a "SHARE" button.

Regarding performing mark detection and area extraction, the smart-cropping module 330 may classify categories of extracted areas according to a form of detected marks. An example of classifying the categories of extracted areas according to the form of detected marks is illustrated in FIG. 15.

Figure 15:
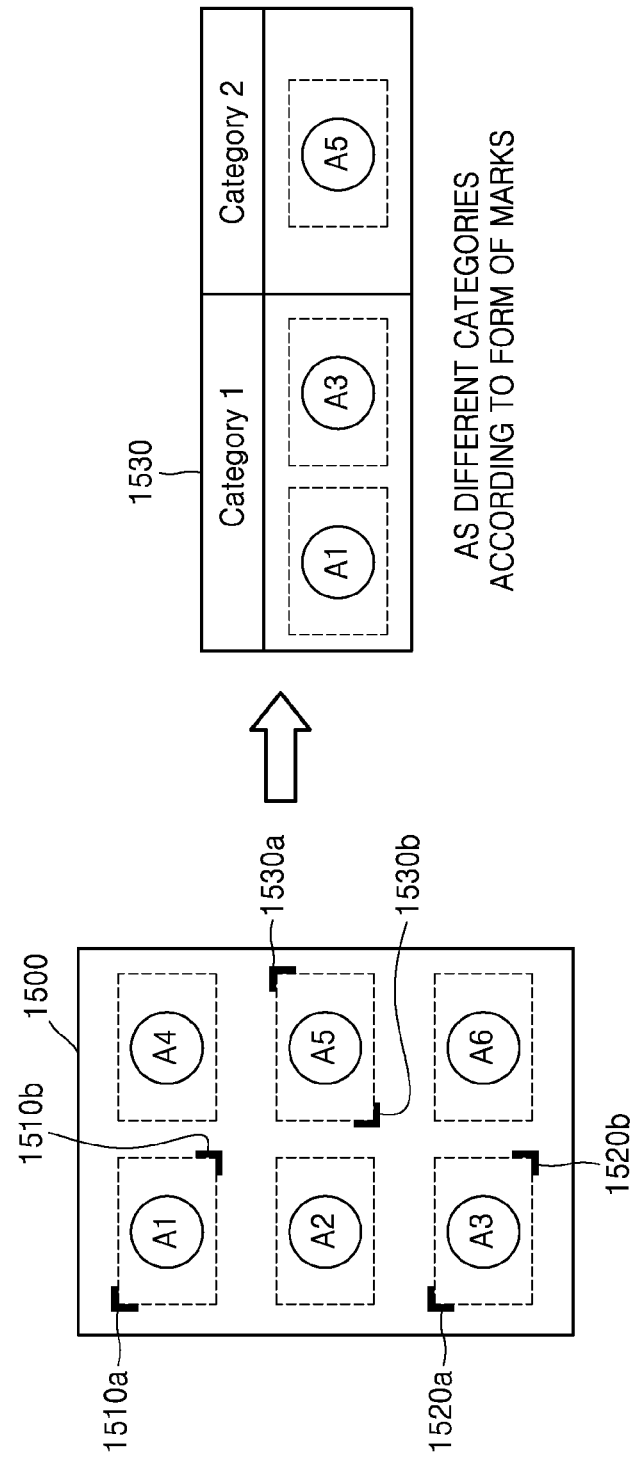
FIG. 15 is a diagram for describing an example of classifying categories of extracted areas according to a form of marks in the method of scanning a document according to an embodiment.

FIG. 15 is a diagram for describing an example of classifying categories of extracted areas according to a form of marks in the method of scanning a document according to an embodiment.

Referring to FIG. 15, an original image 1500 includes first to sixth areas A1 to A6. Also, a pair of marks 1510*a* and 1510*b* defining the first area A1, a pair of marks 1520*a* and 1520*b* defining the third area A3, and a pair of marks 1530*a* and 1530*b* defining the fifth area A5 are marked on the original image 1500. Among the pairs of marks, the pair of marks 1510*a* and 1510*b* defining the first area A1 and the pair of marks 1520*a* and 1520*b* defining the third area A3 each include a top left mark and a bottom right mark. On the contrary, the pair of marks 1530*a* and 1530*b* defining the fifth area A5 includes a top right mark and a bottom left mark.

In the case that areas are defined by pairs of marks in two different forms as such, the smart-cropping module 330 may classify the areas into different categories according to a form of marks that define each of the areas. That is, the smart-cropping module 330 classifies the first area A1 and the third area A3 defined by the top left marks 1510*a* and 1520*a* and the bottom right marks 1510*b* and 1520*b* as Category 1 and the fifth area A5 defined by the top right mark 1530*a* and the bottom left mark 1530*b* as Category 2.

By using such a function, a user may designate an extracted area as a desired category in a process of marking with marks. For example, in the case of a workbook, the user may manage extracted questions by defining an area by using a pair of top left and bottom right marks for an important question and defining an area by using a pair of top right and bottom left marks for a question with a wrong answer.

Figure 16A:
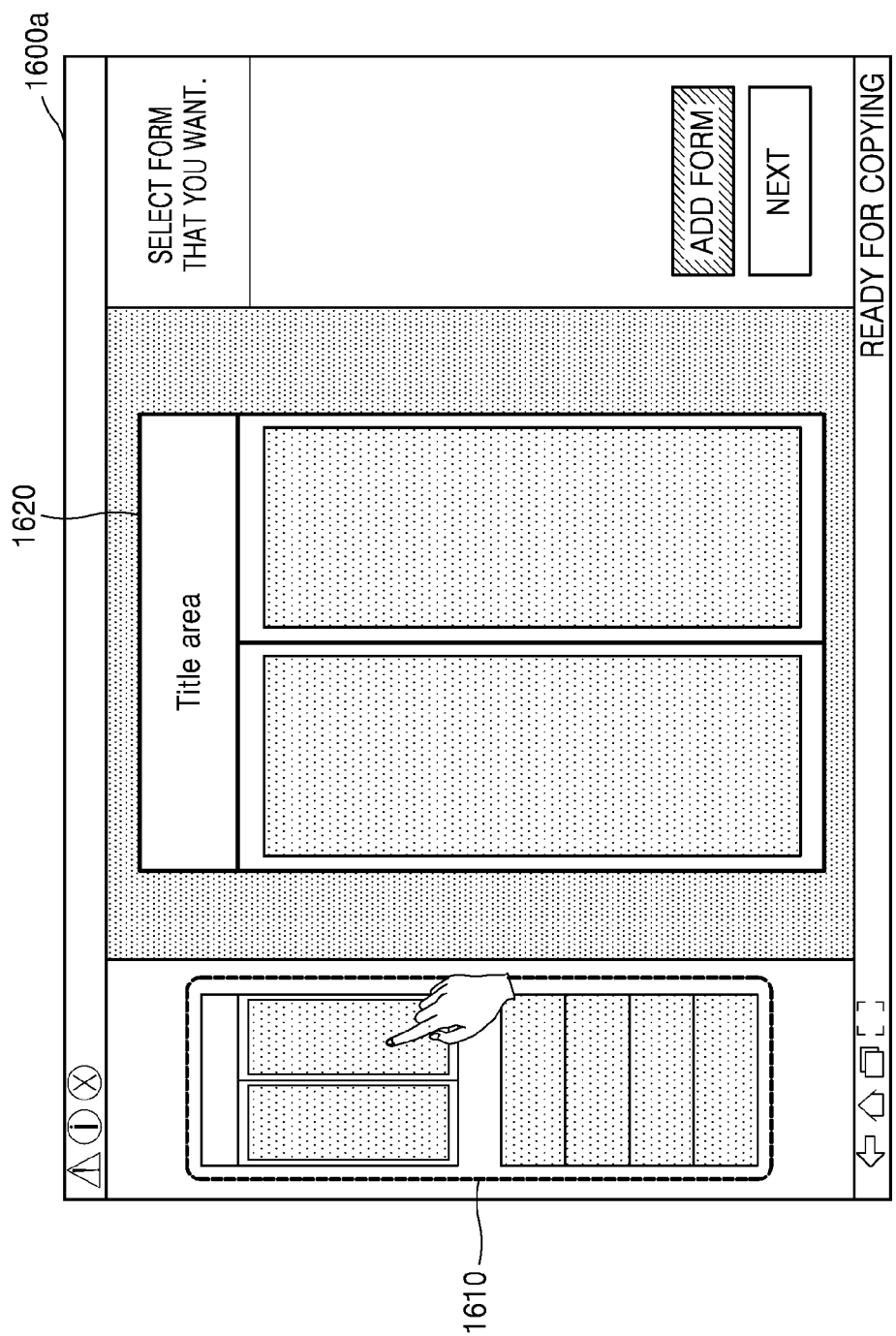

FIGS. 16A and 16B illustrate UI screens 1600*a* and 1600*b* for setting a layout for disposing cropped images on an application for implementing the method of scanning a document according to an example embodiment.

Referring to FIG. 16A, document forms of the layout that have been prepared in advance are displayed as thumbnail images on a thumbnail list 1610 on the left side of the UI screen 1600a. When a user selects any one of the thumbnail images from the thumbnail list 1610, a detailed image 1620 of the selected thumbnail image is displayed in the center of the UI screen 1600a. As such, the user may select any one of document forms that have been prepared in advance.

Referring to FIG. 16B, tools for creating a document form are displayed on a tool list 1630 on the left side of the UI screen 1600b. The user may select any one of the tools displayed on the tool list 1630 and move the selected tool to a preview image 1640 in the center of the UI screen 1600b by using, for example, a drag-and-drop method, thereby creating a document form having a layout in a desired form.

Figure 17:
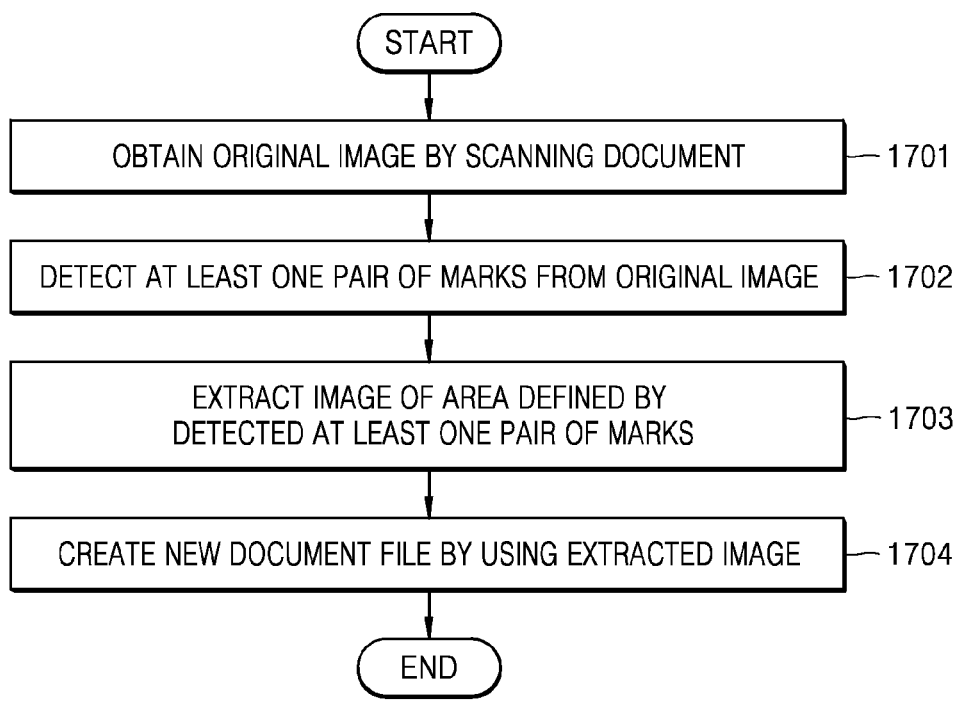
FIGS. 17 through 19 are flowcharts for describing a method of scanning a document, according to an embodiment.
Figure 18:
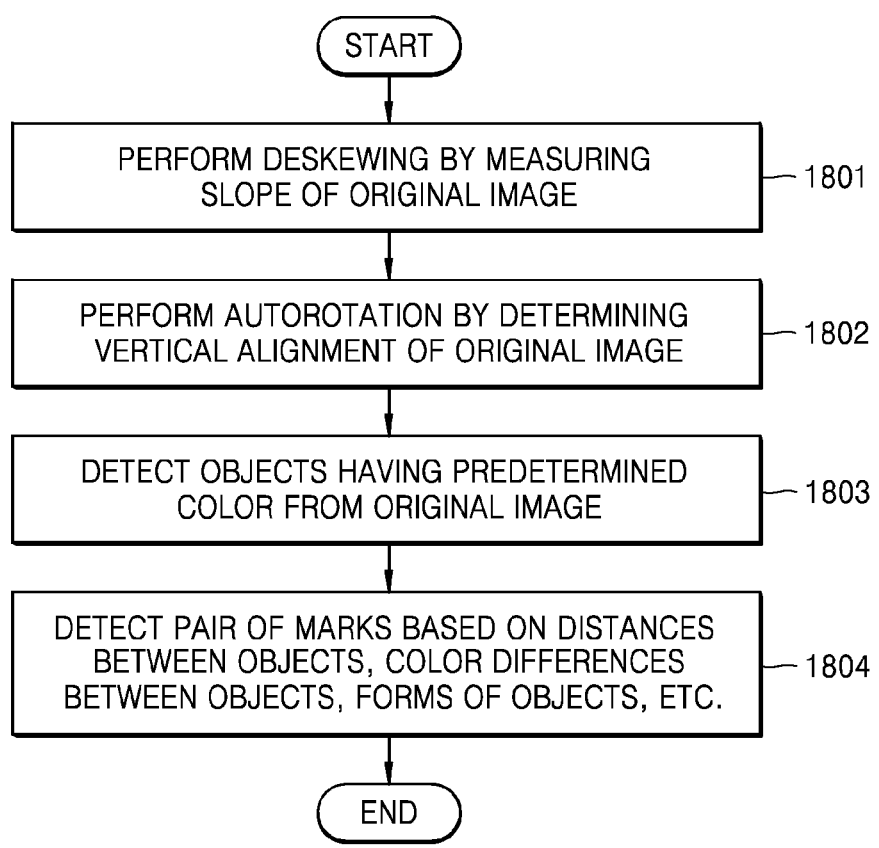
Figure 19:
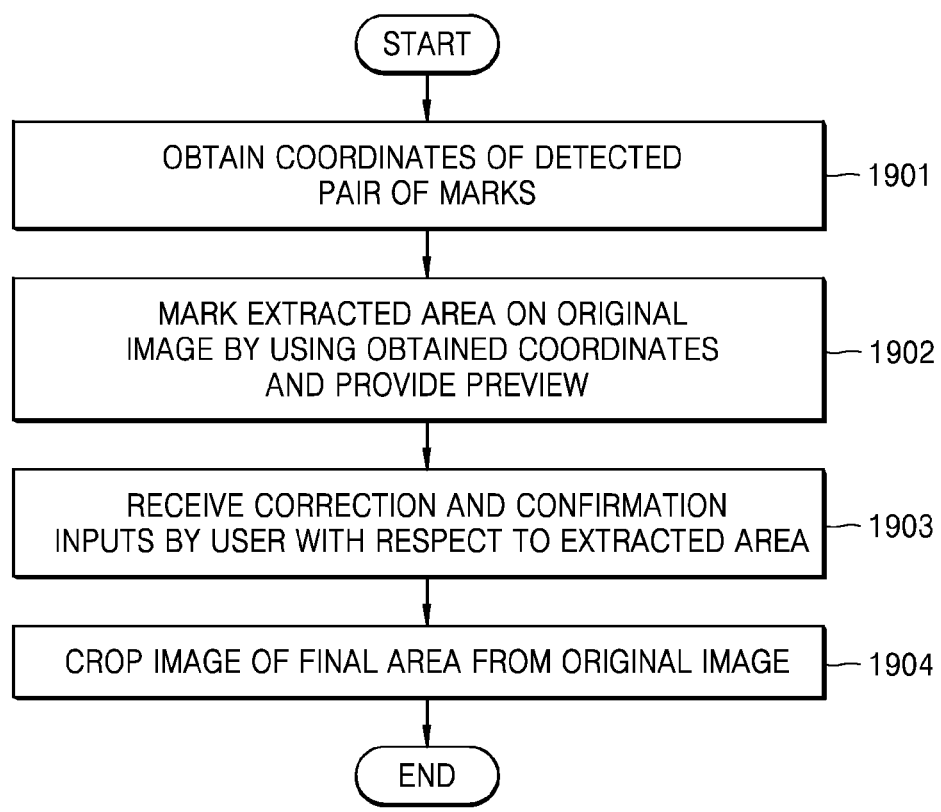

FIGS. 17 through 19 are flowcharts for describing a method of scanning a document, according to an example embodiment. Hereinafter, operations of FIGS. 17 through 19 will be described with reference to the configuration of FIG. 2.

Referring to FIG. 17, in operation 1701, the scanning unit 120 obtains an original image by scanning a document and transmits the original image to the controller 140.

In operation 1702, the controller 140 detects at least one pair of marks from the original image. The controller 140 may perform deskewing and autorotation in order to increase the accuracy of mark pair detection. Detailed operations of detecting a pair of marks will be described in detail below with reference to FIG. 18.

When detecting the pair of marks is completed, in operation 1703, the controller 140 extracts an image of an area defined by the detected at least one pair of marks. That is, the controller 140 obtains coordinates of the detected marks and crops an image of an area defined by the obtained coordinates from the original image. In this process, the controller 140 may display, on the user interface unit 110, a preview where the extracted area has been marked on the original image and may also receive, from a user, correction and confirmation inputs with respect to the extracted area.

Finally, in operation 1704, the controller 140 creates a new document file by using the extracted image. That is, the controller 140 creates a new document file by disposing the extracted image in a predetermined layout, stores the extracted image individually, or extracts text by performing OCR on the extracted image and creates a new document file including the extracted text.

FIG. 18 is a flowchart that illustrates detailed operations that may be included in operation 1702 of FIG. 17.

Referring to FIG. 18, in operation 1801, the controller 140 measures a slope of the original image and may perform deskewing. A detailed method of performing deskewing is the same as described above with reference to FIG. 8.

In operation 1802, the controller 140 determines up-and-down alignment status of the original image and may perform autorotation. A detailed method of performing autorotation is the same as described above with reference to FIG. 9.

In operation 1803, the controller 140 detects objects having a predetermined color from the original image.

In operation 1804, the controller 140 detects a pair of marks based on distances between detected objects, color differences between the detected objects, degrees to which the detected objects match a predetermined form, the number of edges on a boundary of an area that is defined by two objects, and the like. A detailed method of detecting the objects having the predetermined color from the original image and matching the pair of marks from among the detected objects is the same as described above with reference to FIG. 11.

FIG. 19 is a flowchart that illustrates detailed operations that may be included in operation 1703 of FIG. 17.

Referring to FIG. 19, in operation 1901, the controller 140 obtains the coordinates of the detected pair of marks. A detailed method of detecting the coordinates of the pair of marks is the same as described above with reference to FIG. 10.

In operation 1902, the controller 140 provides the preview where the extracted area has been marked on the original image by using the obtained coordinates to the user via the user interface unit 110. A UI screen, on which the preview is displayed, is the same as illustrated in FIG. 12.

In operation 1903, the controller 140 receives, from the user, the correction and confirmation inputs with respect to the extracted area. As described above with reference to FIG. 12, the user may correct or delete the extracted area or add an extracted area via a preview screen.

In operation 1904, the controller 140 crops an image of a final area from the original image.

A workbook composer application may be executed by a mobile terminal such as a smartphone or a tablet PC. That is, when the workbook composer application installed in the mobile terminal is executed, connection between the mobile terminal and an image forming apparatus may be established, and a scan image may be received from the image forming apparatus and processed, or an image stored in the mobile terminal may be processed. In this regard, processing an image, as described above, refers to extracting an image of an area defined by a pair of marks included in an image to be processed and creating a new document file by using the extracted image.

An embodiment in which the workbook composer application is executed by the mobile terminal will now be described with reference to FIGS. 20 and 21.

Figure 20:
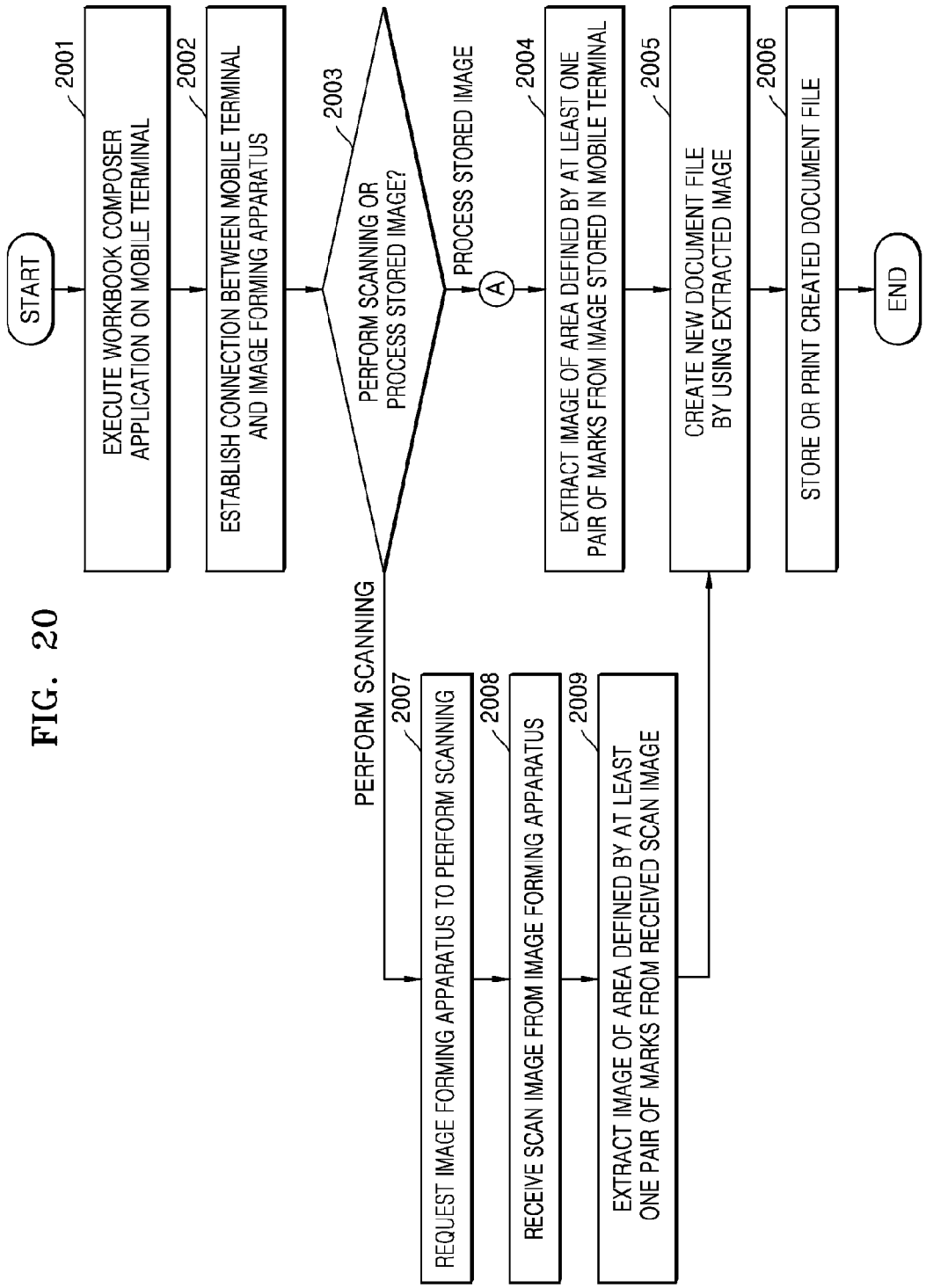
FIG. 20 is a flowchart of a method of executing a workbook composer application, the method performed by a mobile terminal, according to an embodiment.

FIG. 20 is a flowchart of a method of executing a workbook composer application, the method performed by a mobile terminal, according to an embodiment.

Referring to FIG. 20, in operation 2001, the workbook composer application is executed by the mobile terminal. In this regard, the workbook composer application may be an application provided by a third party. Accordingly, a user of the mobile terminal may download the workbook composer application from an application store and install the workbook composer application in the mobile terminal.

When the workbook composer application is executed by the mobile terminal for the first time, the mobile terminal may show a tutorial on a method of using the workbook composer application and may also show a screen for establishing a connection to an image forming apparatus.

In operation 2002, connection between the mobile terminal and the image forming apparatus is established. A list of connectable image forming apparatuses may be displayed on a screen of the mobile terminal, and connection to an image forming apparatus selected by the user from among the image forming apparatuses in the list may be performed. In this regard, when authentication is required, the user has to input authentication information such as a user ID and a password to the mobile terminal to perform authentication. When connection between the mobile terminal and the image forming apparatus has already been established, operation 2002 may be skipped.

In operation 2003, an input of selecting whether to perform scanning and process a scan image or process an image stored in the mobile terminal is received. In this regard, processing an image, as described above, refers to extracting an image of an area defined by a pair of marks included in an image to be processed and creating a new document file by using the extracted image.

When, in operation 2003, the processing of the image stored in the mobile terminal is selected, operation 2004 is performed to extract an image of an area defined by at least one pair of marks from the image stored in the mobile terminal. A detailed process of extracting the image of the area defined by the at least one pair of marks is the same as described above with reference to FIG. 19. In this regard, a UI screen for allowing the user to confirm the extracted image and correct or select the extracted image may be displayed on the screen of the mobile terminal.

In operation 2005, a new document file may be created by using the extracted image, and in operation 2006, the created document file may be stored or printed. In this regard, the created document file may be individually stored or may be stored in a format designated by the user. In some embodiments, the mobile terminal may use the extracted image to create a document file in a printable form, such as a portable document format (PDF) file, and may transmits the created PDF file to the image forming apparatus, to which the mobile terminal is connected, to print the created PDF file.

When, in operation 2003, perform scanning is selected, operation 2007 is performed for the mobile terminal to request the image forming apparatus to perform scanning. When the image forming apparatus scans a document in response to the request and transmits a scan image to the mobile terminal, the mobile terminal receives the scan image from the image forming apparatus, in operation 2008.

In operation 2009, the mobile terminal extracts an image of an area defined by at least one pair of marks from the received scan image. A detailed process of extracting the image of the area defined by the at least one pair of marks is the same as described above with reference to FIG. 19. In this regard, a UI screen for allowing the user to confirm the extracted image and correct or select the extracted image may be displayed on the screen of the mobile terminal.

Next, operations 2005 and 2006 may be performed the same as described above.

Operations 2004 to 2006 of FIG. 20, that is, a process of processing the image stored in the mobile terminal, will now be described with reference to FIG. 21.

Figure 21:
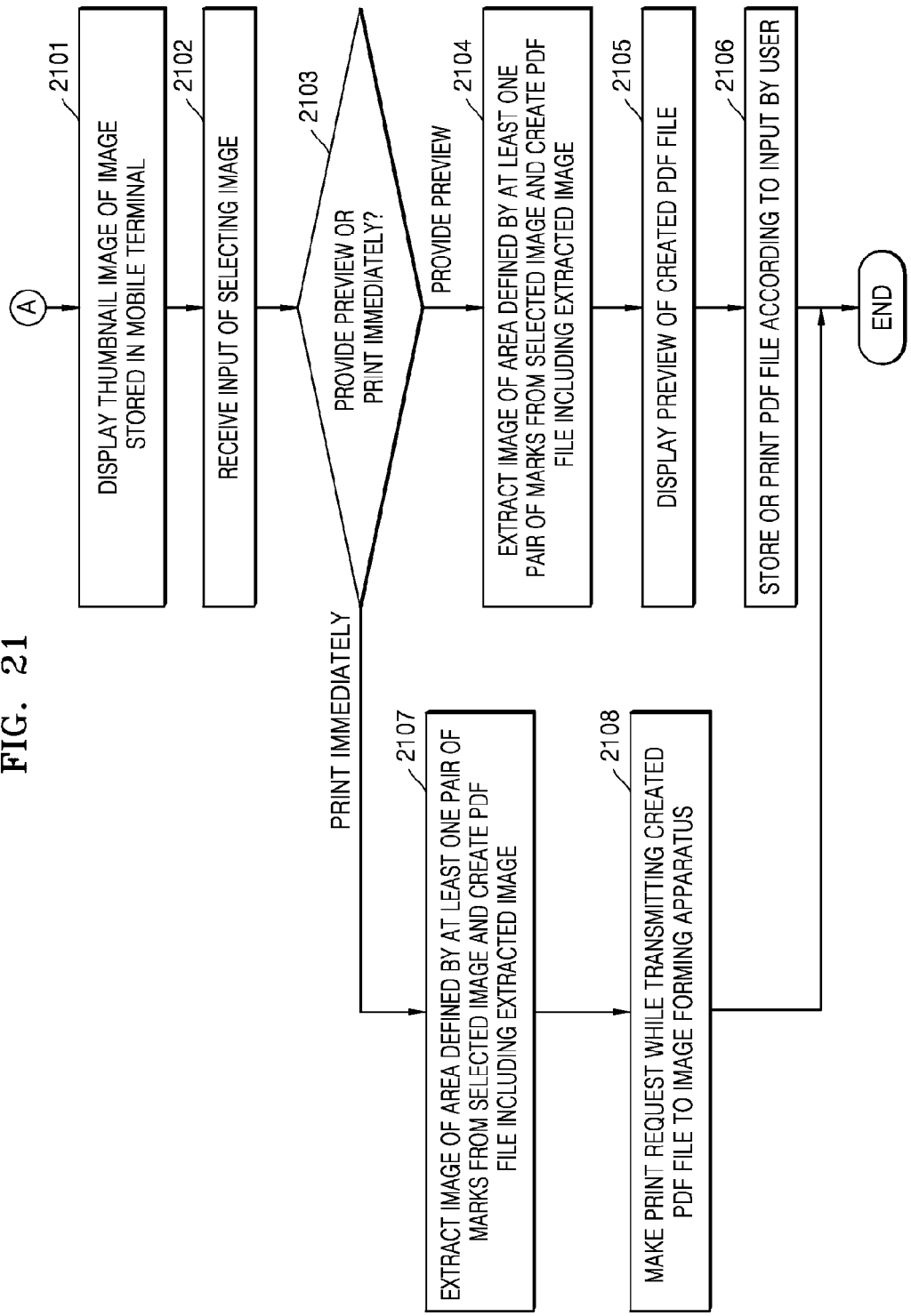
FIG. 21 is a flowchart of a process of processing an image stored in the mobile terminal, according to an embodiment.

FIG. 21 is a flowchart of a process of processing the image stored in the mobile terminal, according to an embodiment. Operation 2101 of FIG. 21 is performed when the processing of the image stored in the mobile terminal is selected in operation 2003 of FIG. 20.

Referring to FIG. 21, in operation 2101, a thumbnail image of the image stored in the mobile terminal is displayed on the screen of the mobile terminal.

In operation 2102, an input of selecting an image to be processed is received from the user.

In operation 2103, an input of selecting whether to provide a preview after processing the selected image or perform printing immediately is received.

When, in operation 2103, providing a preview is selected, operation 2104 is performed to extract an image of an area defined by at least one pair of marks from the selected image and create a PDF file including the extracted image. In this regard, a UI screen for allowing the user to confirm the extracted image and correct or select the extracted image may be displayed on the screen of the mobile terminal.

In operation 2105, a preview of the created file is displayed on the screen of the mobile terminal. The user may confirm the created PDF file on the screen of the mobile terminal and may store the created PDF file or make a print request for the created PDF file.

In operation 2106, according to an input by the user, the PDF file may be stored in the mobile terminal, or a print request for the PDF file may be made while the PDF file is transmitted to the image forming apparatus.

When, in operation 2103, performing printing immediately is selected, operation 2107 is performed to extract an image of an area defined by at least one pair of marks from the selected image and create a PDF file including the extracted image. In this regard, a UI screen for allowing the user to confirm the extracted image and correct or select the extracted image may be displayed on the screen of the mobile terminal.

Once the PDF file is completely created, the mobile terminal may transmits the created PDF file to the image forming apparatus to print the created PDF file, in operation 2108.

As described above, according to one or more of the above exemplary embodiments, when a user designates an area that the user wants to be extracted from a document by marking the document with marks and performs scanning, an area defined by the marks may be automatically extracted in the performing of scanning, and a new document may be created by disposing the extracted area in a predetermined layout or the extracted area may be stored individually. Accordingly, user convenience in scanning and editing a document may be improved.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The above-described exemplary embodiments may be implemented as an executable program, and may be executed by a digital computer that is configured to run the program by using a computer-readable recording medium. Examples of the computer-readable recording medium include, but are not limited to, storage media such as magnetic storage media (e.g. read only memories (ROMs), floppy discs, or hard discs), optically readable media (e.g. compact disk-read only memories (CD-ROMs), or digital versatile disks (DVDs)).

What is claimed is:

1. A method of scanning a document, comprising: obtaining an original image by scanning a document, the document including:
    a plurality of selectively identifiable areas having respective images, and at least two pairs of marks, the at least two pairs of marks including a first pair of marks defining a size of at least one of the selectively identifiable areas and a second pair of marks defining a size of at least another one of the selectively identifiable areas;
    measuring a slope of the original image based on slopes of objects other than the at least two pairs of marks included in at least one of the selectively identifiable areas;
    rotating the original image based on the measured slope; and after the original image is rotated, detecting the first and second pair of marks included in the rotated original image;

extracting a first image of a first area defined by the detected first pair of marks from the rotated original image and a second image of a second area defined by the detected second pair of marks from the rotated original image; and creating a new document file based on at least one of the extracted first and second images.

2. The method of claim 1, wherein detecting the first pair of marks comprises:

detecting objects having a predetermined color on the rotated original image; and matching a pair of marks among the detected objects based on at least one of distances between the detected objects, color differences between the detected objects, and degrees to which the detected objects match a predetermined form.

3. The method of claim 1, wherein the objects are included in the at least one of the selectively identifiable areas defined by the first pair of marks.

4. The method of claim 1, further comprising:

determining a vertical alignment of the original image;

if the original image is determined to be upside down, rotating the original image to be rightside up; and after the original image is rotated to be rightside up, detecting the first pair of marks on the rotated original image.

5. The method of claim 1, wherein extracting the first image comprises:

automatically classifying a category of the extracted first image according to a form of marks that define the first area.

6. The method of claim 1, wherein the creating comprises:

confirming a predetermined layout; and creating the new document file by disposing at least one of the extracted first and second images in the confirmed predetermined layout.

7. The method of claim 1, wherein the creating comprises individually storing at least one of the extracted first and second images.

8. The method of claim 1, wherein the creating comprises:

extracting text by performing optical character recognition (OCR) on at least one of the extracted first and second images; and storing the new document file comprising the extracted text.

9. A non-transitory computer-readable recoding medium having recorded thereon a program for executing the method of claim 1 on a computer.

10. An image forming apparatus comprising: an operation panel for displaying a screen and receiving input;

a scanning unit configured to obtain an original image by scanning a document when a scanning command is received through the operation panel, wherein the document comprises a plurality of selectively identifiable areas having respective images and at least two pairs of marks, the at least two pairs of marks including a first pair of marks defining a size of at least one of the selectively identifiable areas and a second pair of marks defining a size of at least another one of the selectively identifiable areas;

a controller configured to:

receive the original image from the scanning unit, measure a slope of the original image based on slopes of objects other than the at least two pairs of marks included in at least one of the selectively identifiable areas, rotate the original image based on the measured slope, detect the first and second pair of marks included in the rotated original image, extract a first image of a first area defined by the detected first pair of marks from the rotated original image and a second image of a second area defined by the detected second pair of marks from the rotated original image, and create a new document file based on at least one of the extracted first and second images; and a memory configured for storing data to create the new document file.

11. The apparatus of claim 10, wherein the controller is configured to detect objects that have a predetermined color on the rotated original image, and matches a pair of marks among the detected objects based on at least one of distances between the detected objects, color differences between the detected objects, and degrees to which the detected objects match a predetermined form.

12. The apparatus of claim 10, wherein the objects are included in the at least one of the selectively identifiable areas defined by the first pair of marks.

13. The apparatus of claim 10, wherein the controller is configured to determine vertical alignment of the original image, rotate the original image rightside up if the original image is determined to be upside down, and detect the first pair of marks on the rotated rightside up original image.

14. The apparatus of claim 10, wherein the controller is configured to automatically classify a category of the extracted first image accordingly to a form of marks that define the first area.

15. The apparatus of claim 10, wherein the controller is configured to confirm a predetermined layout and create the new document file by disposing at least one of the extracted first and second images in the confirmed predetermined layout.

16. The apparatus of claim 10, wherein the controller is configured to individually store at least one of the extracted first and second images.

17. The apparatus of claim 10, wherein the controller is configured to extract text by performing optical character recognition (OCR) on at least one of the extracted first and second images and create the new document file comprising the extracted text.

18. The apparatus of claim 10, wherein the controller is configured to control the operation panel to display a preview of at least one of the extracted first and second images on a user interface of the screen for the user to selectively delete at least one of the extracted first and second images.

19. The method of claim 1, comprising:

displaying, on a user interface, a preview of a document based on at least one of the extracted first and second images in which at least one of the extracted first and second images are arranged in a predetermined layout; and receiving an input rearranging at least one of the extracted first and second images in the predetermined layout.

20. The method of claim 1, wherein the detected first pair of marks from the rotated original image are disposed in a first arrangement relative to the first image in the rotated original image, the detected second pair of marks from the rotated original image are disposed in a second arrangement relative to the second image in the rotated original image, the second arrangement being different from the first arrangement, and the extracting comprises automatically classifying the extracted first image into a first category according to the first arrangement and automatically classifying the extracted second image into a second category according to the second arrangement.

\* \* \* \* \*